United States Patent
Vougioukas et al.

(10) Patent No.: US 12,293,185 B2
(45) Date of Patent: May 6, 2025

(54) BRANCH PREDICTION USING HYPERVECTORS

(71) Applicant: Arm Limited, Cambridge (GB)

(72) Inventors: Ilias Vougioukas, Cambridge (GB); Andreas Lars Sandberg, Cambridge (GB); Nikos Nikoleris, Cambridge (GB)

(73) Assignee: Arm Limited, Cambridge (GB)

( * ) Notice: Subject to any disclaimer, the term of this patent is extended or adjusted under 35 U.S.C. 154(b) by 38 days.

(21) Appl. No.: 18/245,840

(22) PCT Filed: Nov. 26, 2020

(86) PCT No.: PCT/EP2020/083485
§ 371 (c)(1),
(2) Date: Mar. 17, 2023

(87) PCT Pub. No.: WO2022/063419
PCT Pub. Date: Mar. 31, 2022

(65) Prior Publication Data
US 2023/0342150 A1    Oct. 26, 2023

(30) Foreign Application Priority Data
Sep. 24, 2020 (EP) .................................... 20386046

(51) Int. Cl.
*G06F 9/30* (2018.01)
*G06F 9/38* (2018.01)
(52) U.S. Cl.
CPC ...... *G06F 9/30061* (2013.01); *G06F 9/30036* (2013.01); *G06F 9/3804* (2013.01); *G06F 9/3844* (2013.01); *G06F 9/3848* (2013.01)
(58) Field of Classification Search
CPC ............. G06F 9/30061; G06F 9/30036; G06F 9/3804; G06F 9/3844; G06F 9/3848
See application file for complete search history.

(56) References Cited

U.S. PATENT DOCUMENTS 10,949,208 B2 *  3/2021  Gupta ................... G06F 9/3848
10,956,161 B2 *  3/2021  Sadasivam ............ G06F 9/3844
(Continued)

FOREIGN PATENT DOCUMENTS

WO    2017/193077 A1    11/2017

OTHER PUBLICATIONS

Huang Mingkai, et al., "An Energy-Efficient Branch Prediction with Grouped Global History", International Conference on Parallel Processing, IEEE, Sep. 1, 2015 (Sep. 1, 2015), pp. 140-149, XP032828151, ISSN: 0190-3918, DOI: 10.1109/ICPP.2015.23; [retrieved on Dec. 8, 2015] the whole document.

*Primary Examiner* — Corey S Faherty
(74) *Attorney, Agent, or Firm* — NIXON & VANDERHYE P.C.

(57) ABSTRACT

Apparatuses and methods for branch prediction are provided. Branch prediction circuitry generates prediction with respect to branch instructions of whether those branches will be taken or not-taken. Hypervector generation circuitry assigns an arbitrary hypervector in deterministic dependence on an address of each branch instruction, wherein the hypervectors comprises at least 500 bits. Upon the resolution of a branch a corresponding hypervector is added to a stored taken hypervector or a stored not-taken hypervector in dependence on the resolution of the branch. The branch prediction circuitry generates a prediction for a branch instructions in dependence on a mathematical distance metric of a hypervector generated for that branch instruction from the stored taken hypervector or the not-taken hypervector.

19 Claims, 13 Drawing Sheets

(56) References Cited

U.S. PATENT DOCUMENTS

Figure 1:
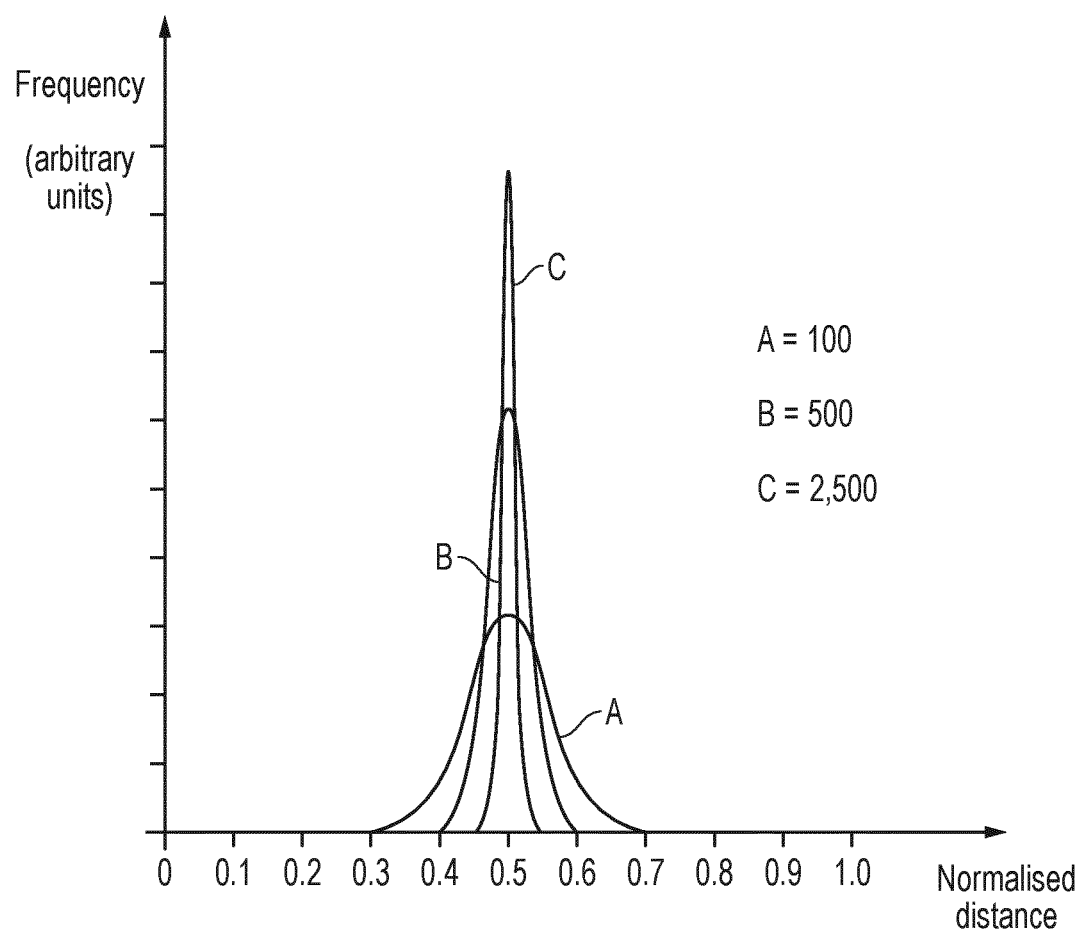

| | | |
|---|---|---|
| 2011/0087866 A1 | 4/2011 | Shah et al. |
| 2015/0363201 A1* | 12/2015 | Eickemeyer .......... G06F 9/3806 712/239 |
| 2017/0322810 A1* | 11/2017 | Navada ............... G06F 9/30036 |
| 2019/0166158 A1 | 5/2019 | Grocutt et al. |

* cited by examiner

BRANCH PREDICTION USING HYPERVECTORS

The present techniques relate to data processing. More particularly they relate to branch prediction.

A data processing apparatus which executes a sequence of instructions which comprise branch instructions may be provided with the capability to predict the outcome of a given branch based on past behaviour and on that basis to speculatively execute further instructions following the assumed outcome before the given branch actually resolves. Such branch prediction mechanisms enhance the instruction execution throughput of an apparatus, since it need not wait for each branch to resolve before the instructions which follow the branch outcome are executed. Furthermore the occasions on which the branch prediction is correct may be relatively infrequent if the branch predictor is well trained and the price of abandoning the data processing incorrectly speculatively performed maybe significantly outweighed by the instruction execution throughput advantages of speculative execution. Nevertheless opportunities remain for further improvements in branch prediction technologies.

At least some examples provide an apparatus comprising:
processing circuitry to perform data processing operations in response instructions, wherein the instructions comprises branch instructions;
branch prediction circuitry to generate a prediction with respect to a branch instruction of whether a branch specified by the branch instruction will be taken or not-taken; and
hypervector storage to store at least one of a taken hypervector and a not-taken hypervector,
wherein the processing circuitry is arranged to perform speculative instruction execution based on the prediction generated by the branch prediction circuitry,
and the branch prediction circuitry comprises hypervector generation circuitry to assign an arbitrary hypervector in deterministic dependence on an address of the branch instruction, wherein the hypervector comprises at least 500 bits,
wherein the branch prediction circuitry is responsive to a resolution of the branch specified by the branch instruction when the processing circuitry has executed the branch instruction to add the hypervector to the stored taken hypervector or the stored not-taken hypervector in dependence on the resolution of the branch,
and wherein the branch prediction circuitry is arranged to generate the prediction in dependence on a mathematical distance metric of the hypervector from the stored at least one of the taken hypervector and the not-taken hypervector.

At least some examples provide a method of branch prediction comprising:
performing data processing operations in response instructions, wherein the instructions comprises branch instructions;
generating a prediction with respect to a branch instruction of whether a branch specified by the branch instruction will be taken or not-taken;
storing at least one of a taken hypervector and a not-taken hypervector;
performing speculative instruction execution based on the prediction generated;
assigning an arbitrary hypervector in deterministic dependence on an address of the branch instruction, wherein the hypervector comprises at least 500 bits;
adding the hypervector to the stored taken hypervector or the stored not-taken hypervector in dependence on a resolution of the branch when the branch instruction has been executed; and
generating the prediction in dependence on a mathematical distance metric of the hypervector from the stored at least one of the taken hypervector and the not-taken hypervector.

At least some examples provide an apparatus comprising:
means for performing data processing operations in response instructions, wherein the instructions comprises branch instructions;
means for generating a prediction with respect to a branch instruction of whether a branch specified by the branch instruction will be taken or not-taken;
means for storing at least one of a taken hypervector and a not-taken hypervector;
means for performing speculative instruction execution based on the prediction generated;
means for assigning an arbitrary hypervector in deterministic dependence on an address of the branch instruction, wherein the hypervector comprises at least 500 bits;
means for adding the hypervector to the stored taken hypervector or the stored not-taken hypervector in dependence on a resolution of the branch when the branch instruction has been executed; and
means for generating the prediction in dependence on a mathematical distance metric of the hypervector from the stored at least one of the taken hypervector and the not-taken hypervector.

Figure 2:
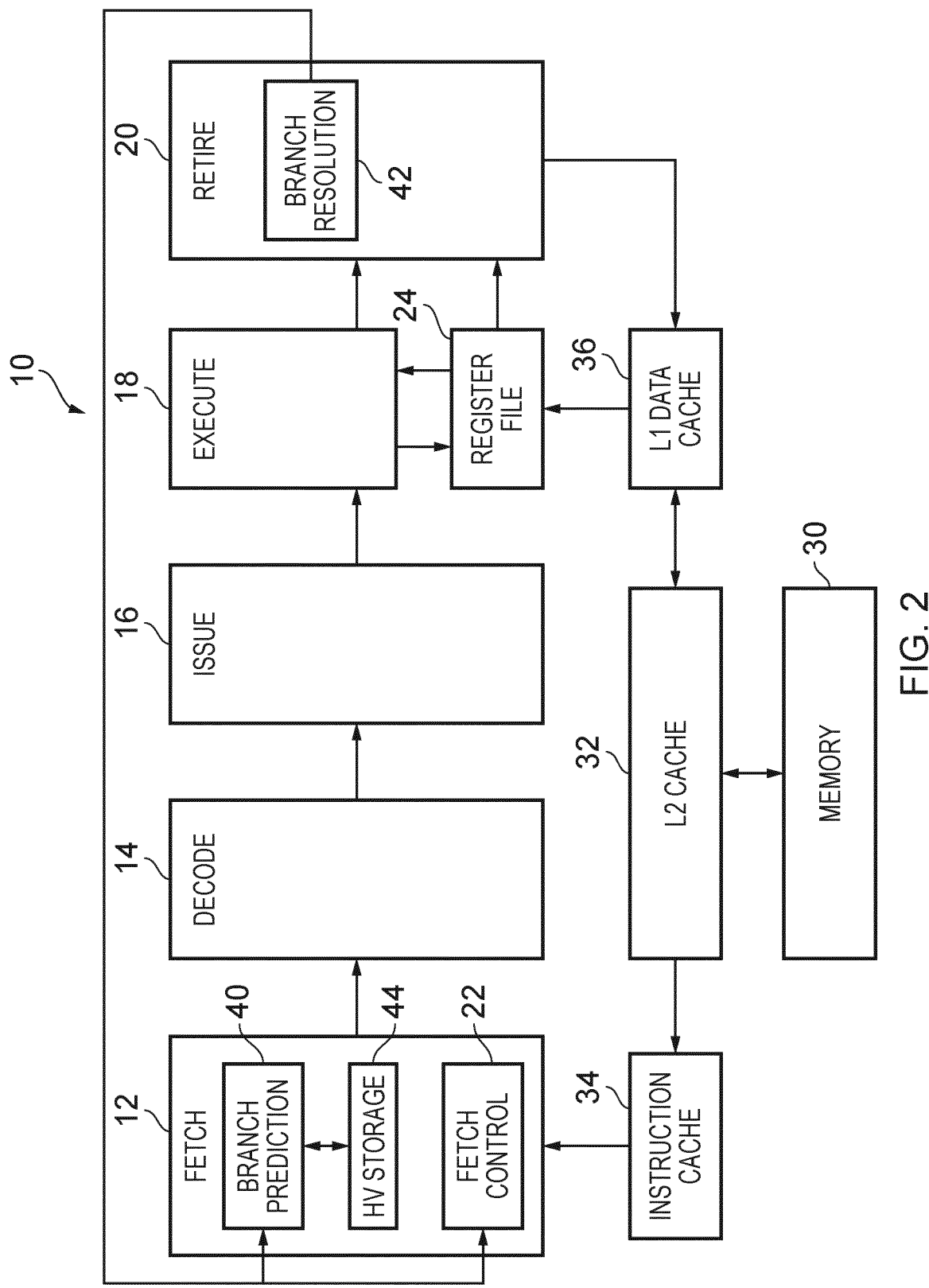
Figure 3:
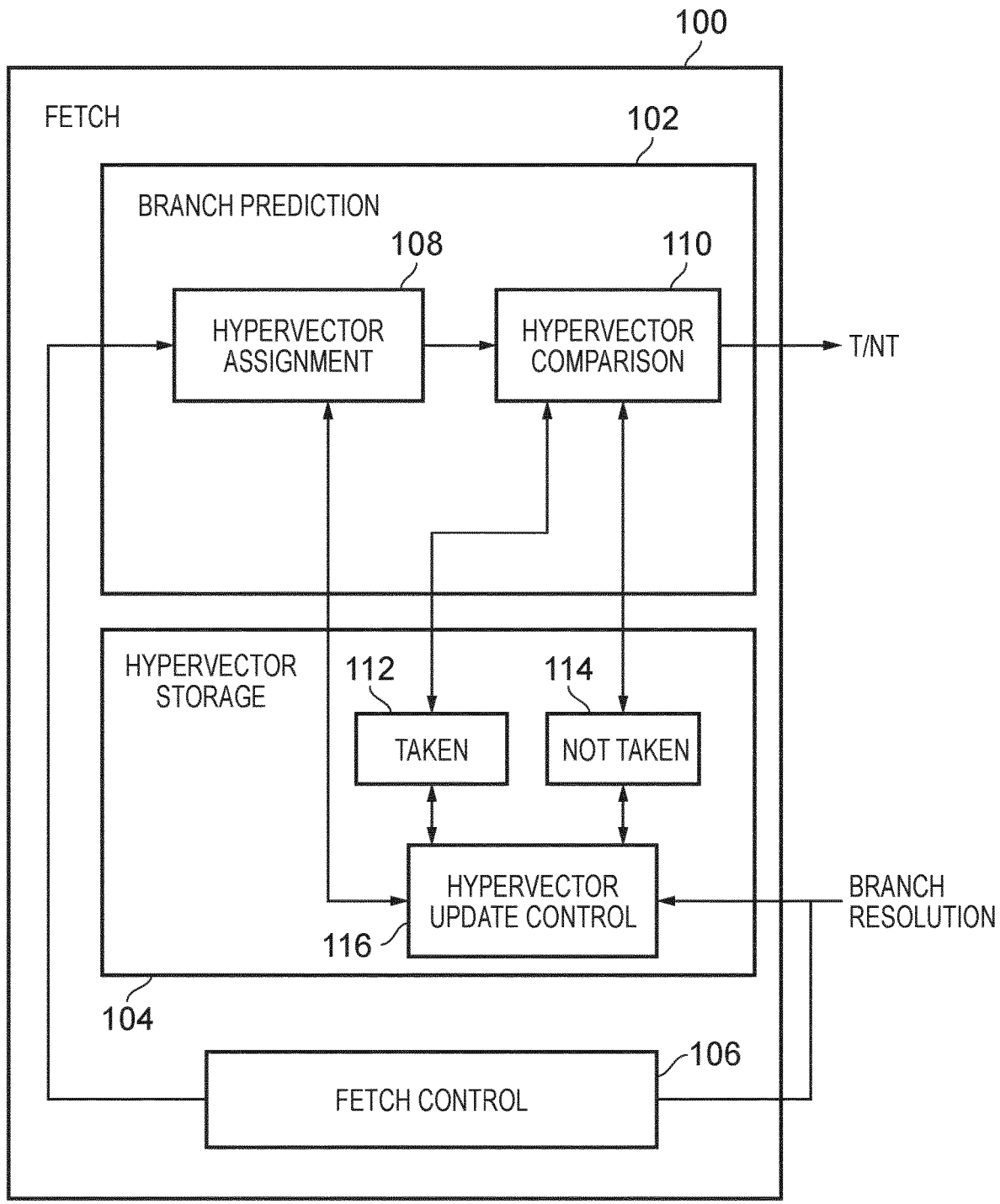
Figure 4A:
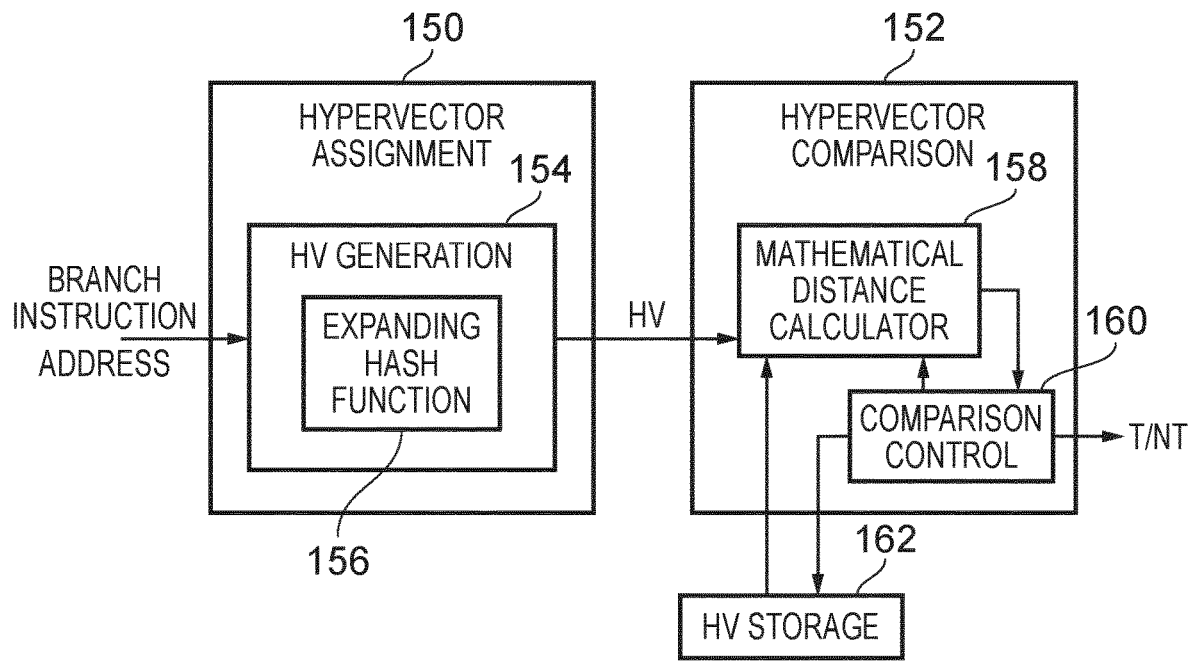
Figure 4B:
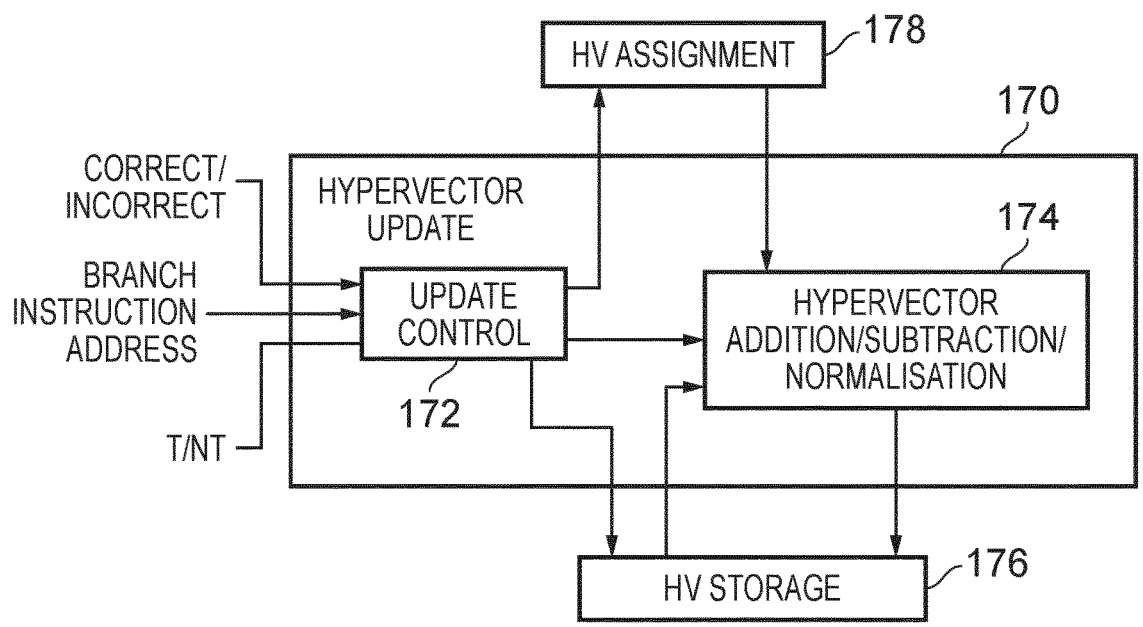
Figure 4C:
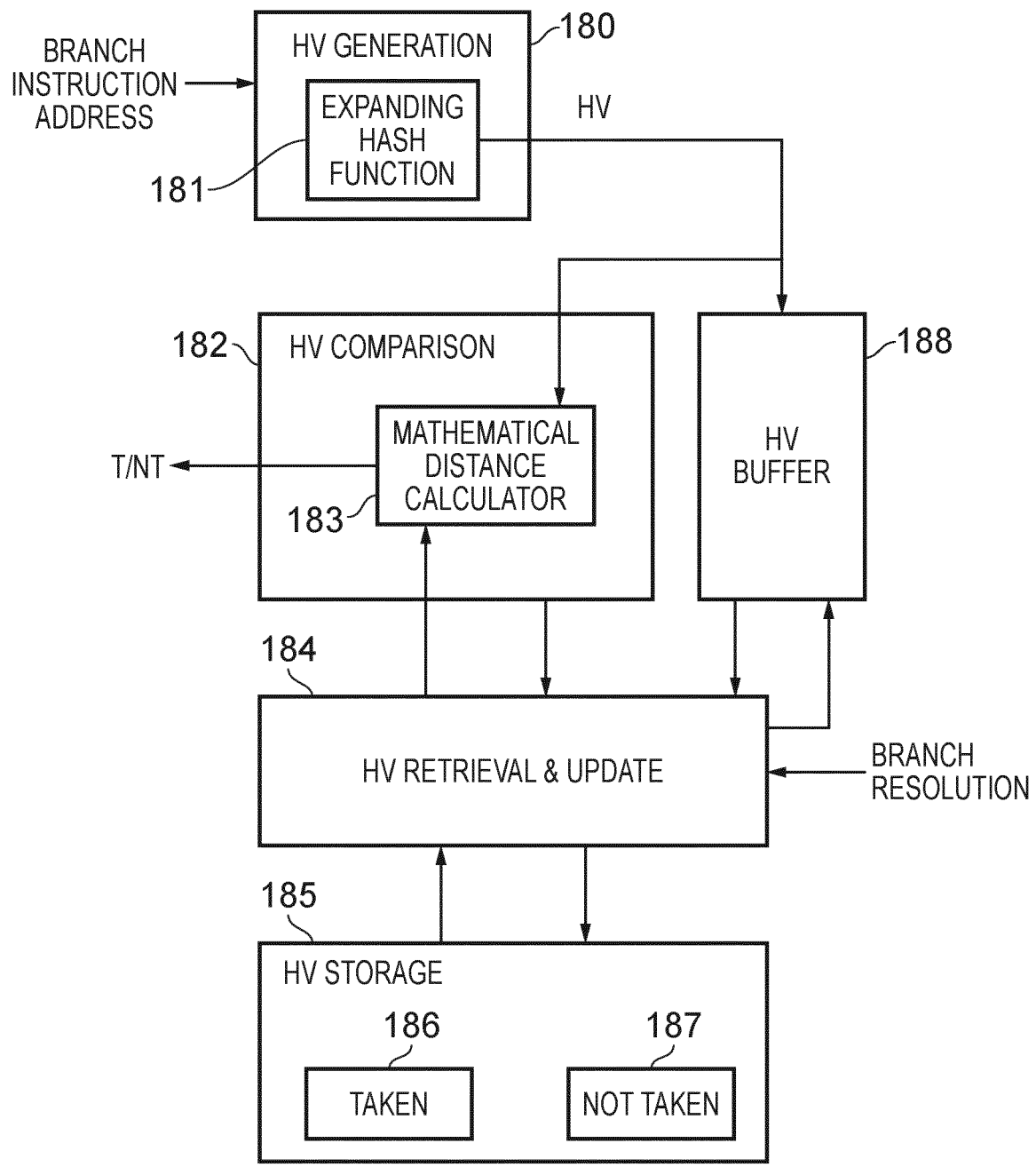
Figure 5A:
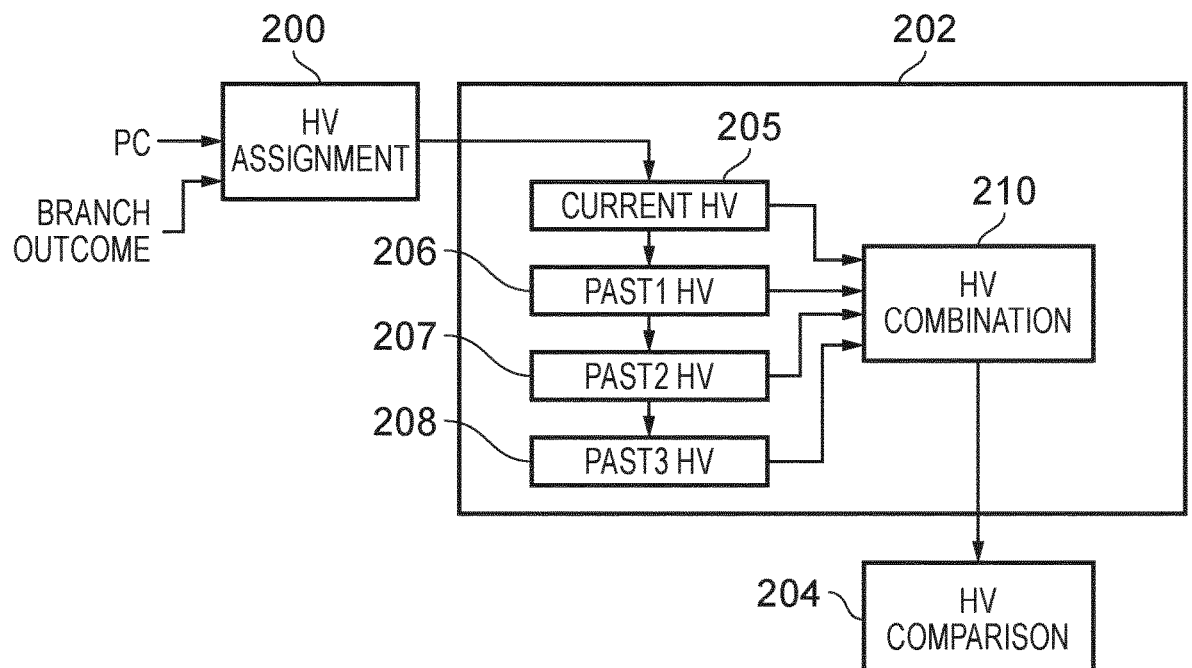
Figure 5B:
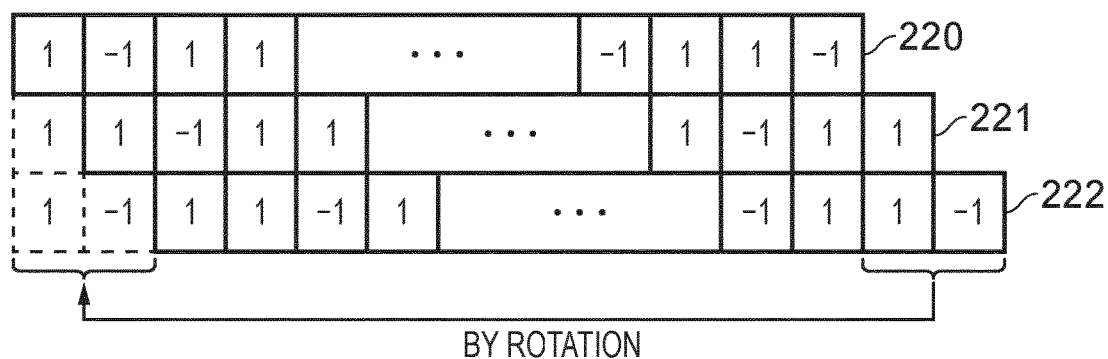
Figure 6A:
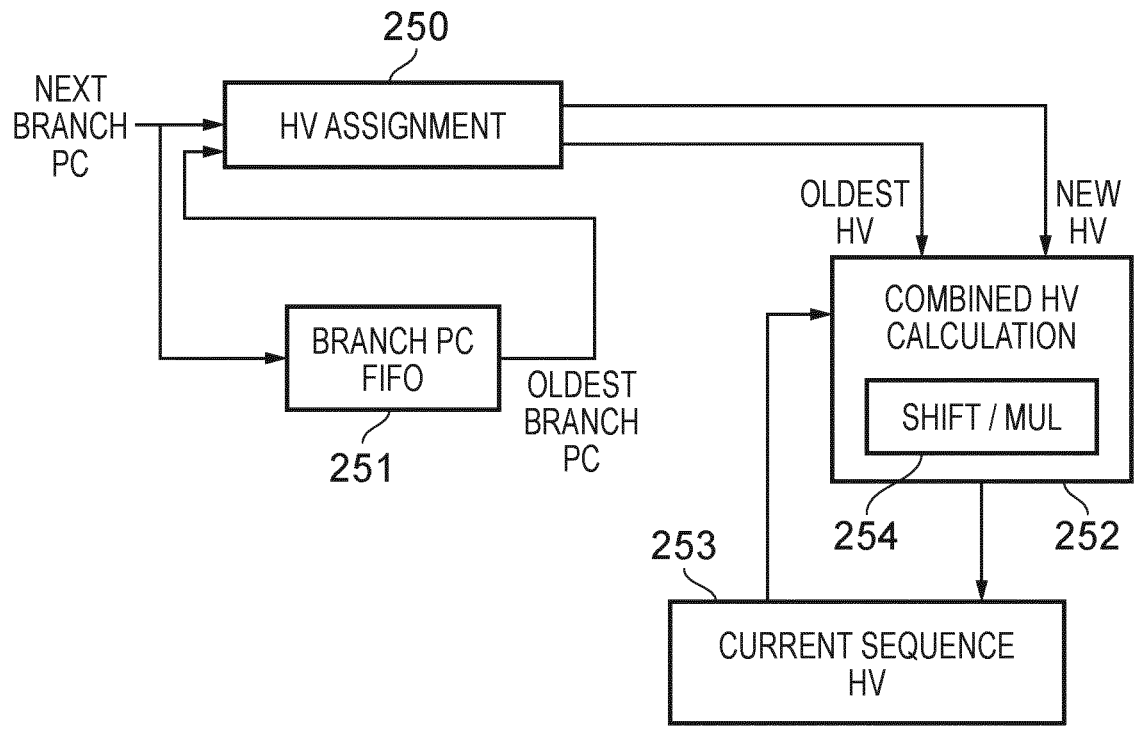
Figure 6B:
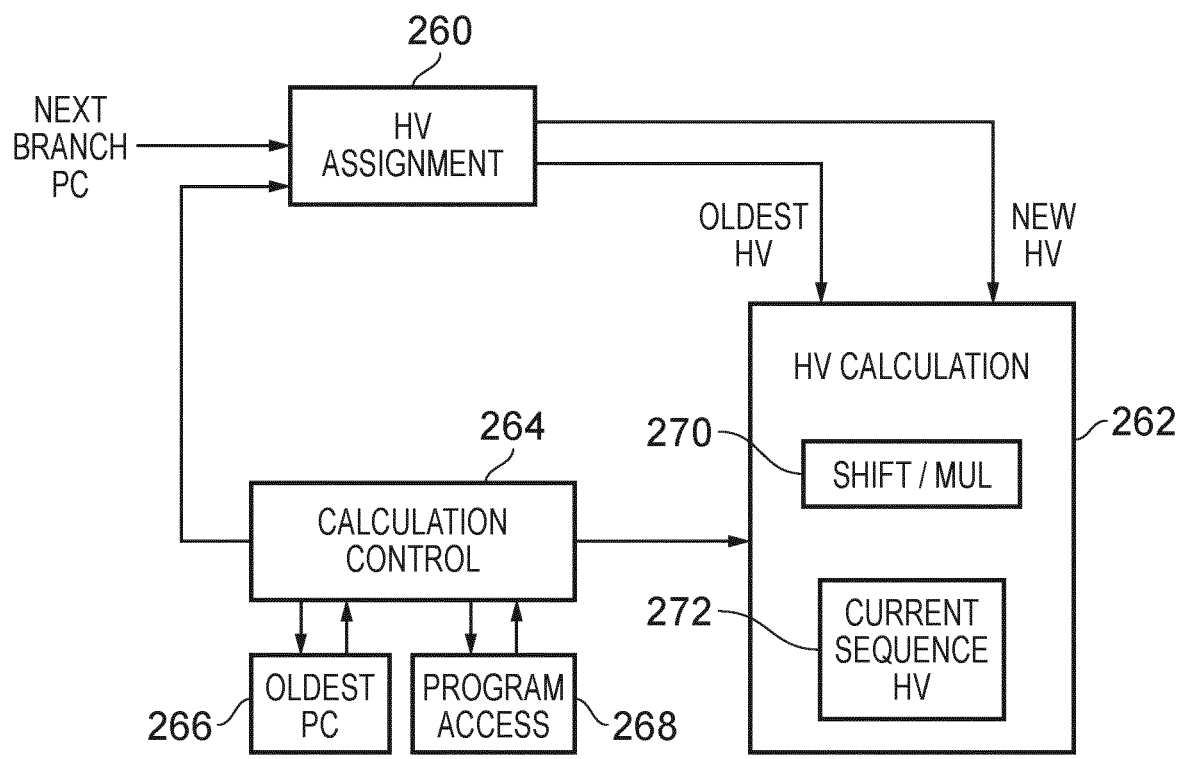
Figure 7:
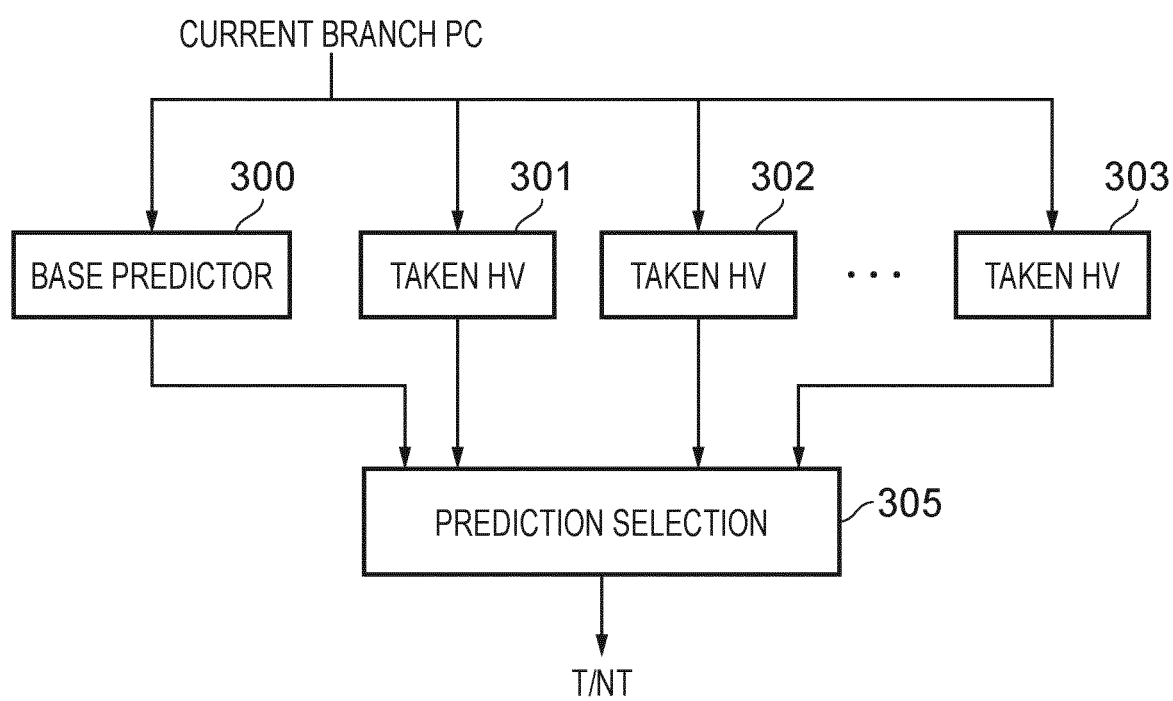
Figure 8A:
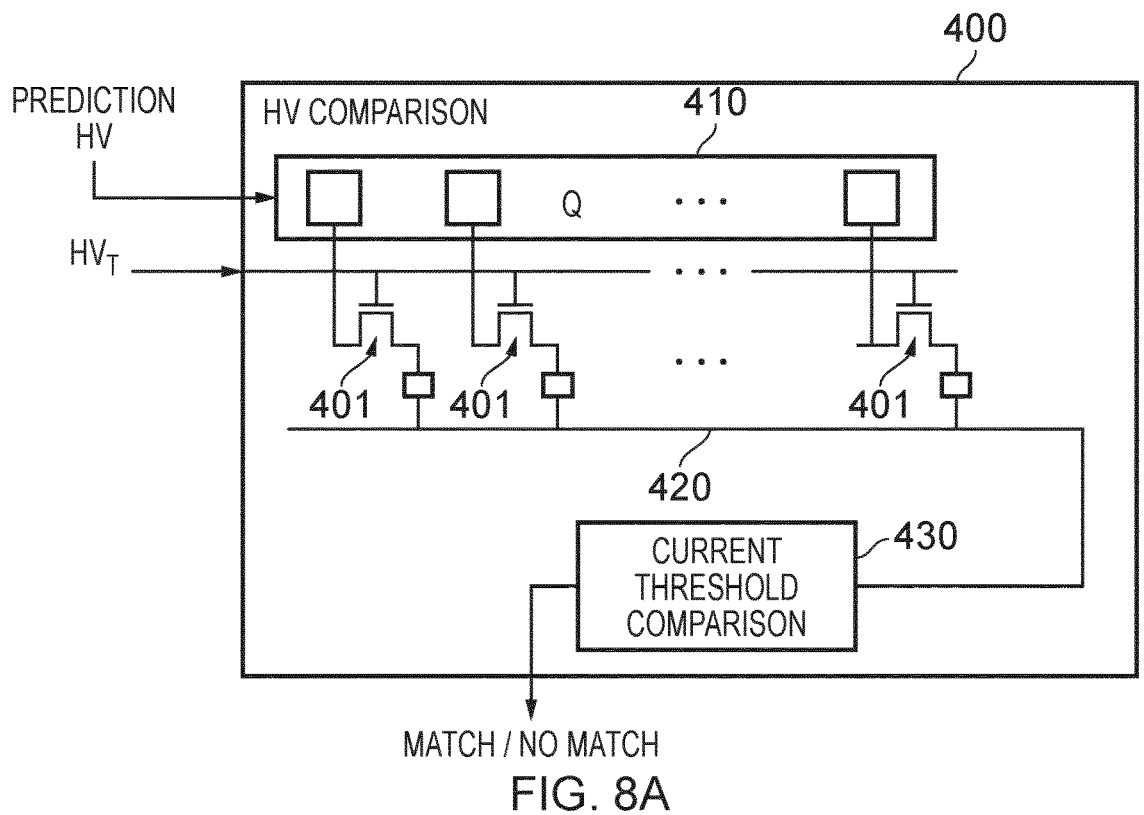
Figure 8B:
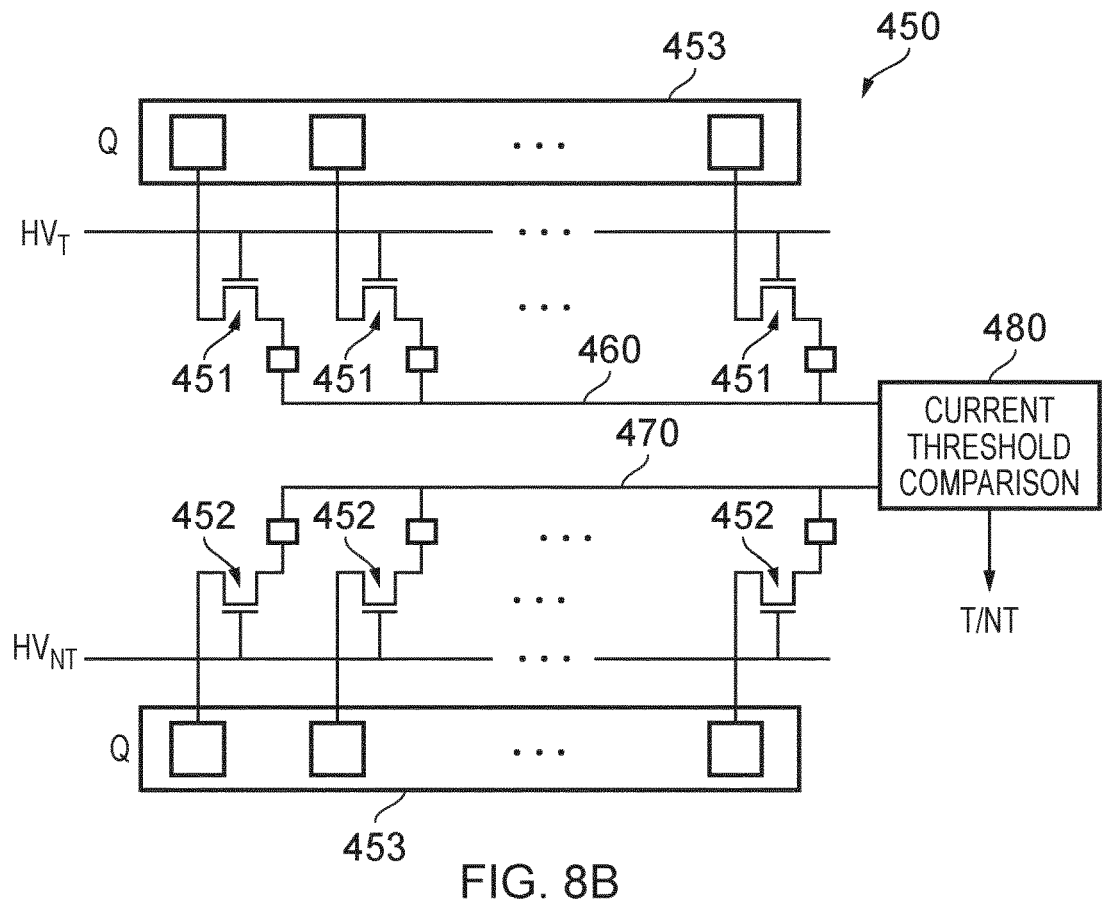
Figure 9:
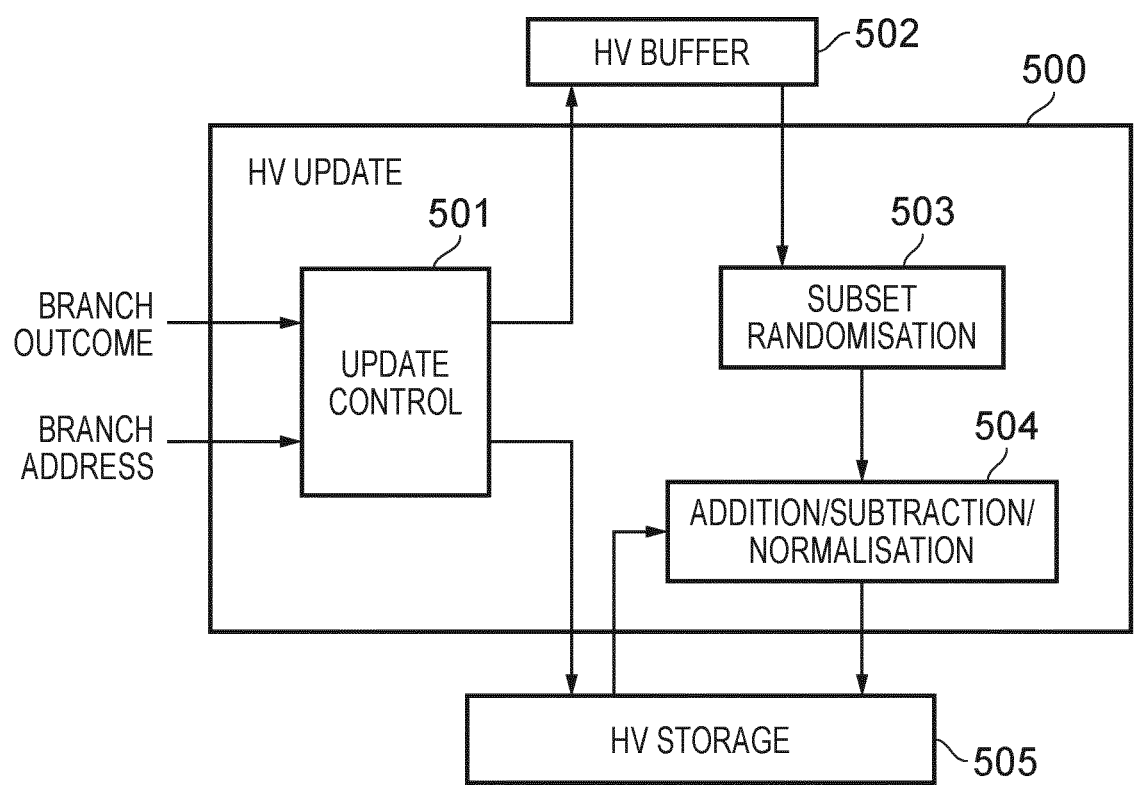
Figure 10:
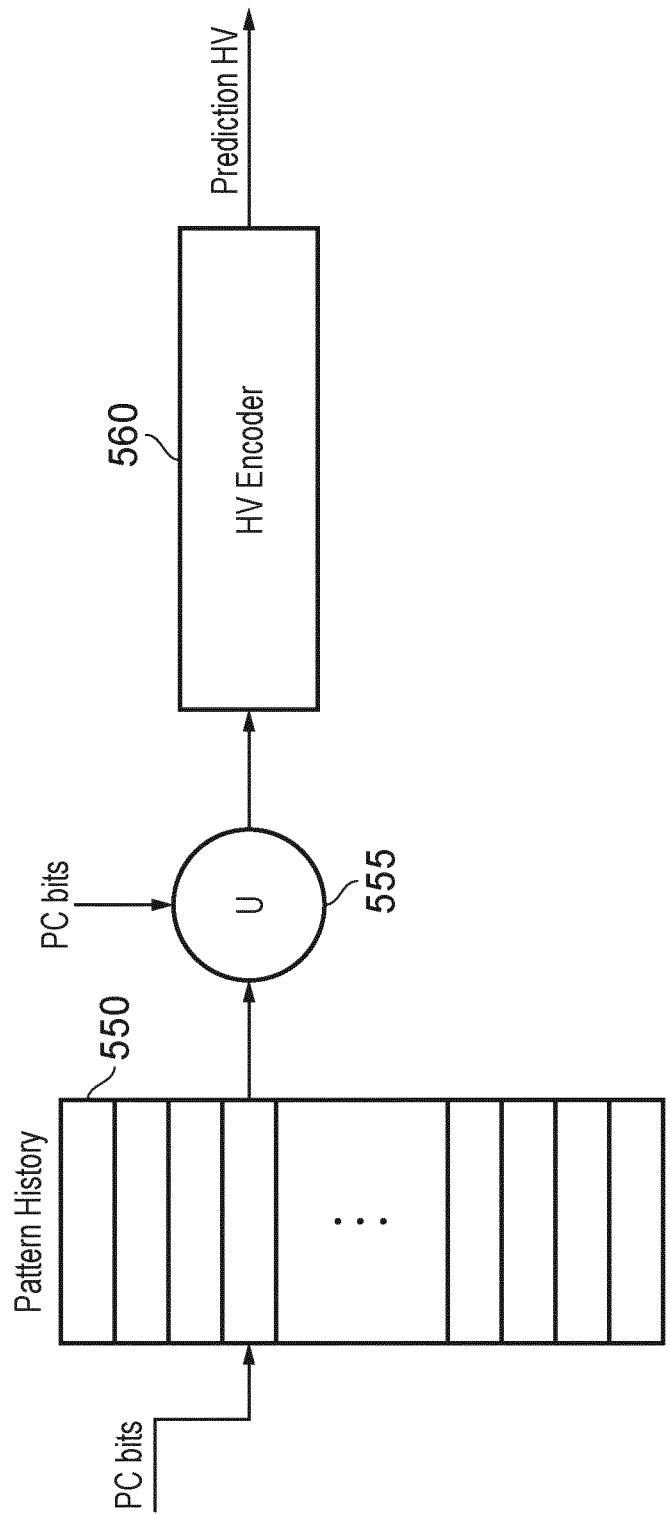
Figure 11:
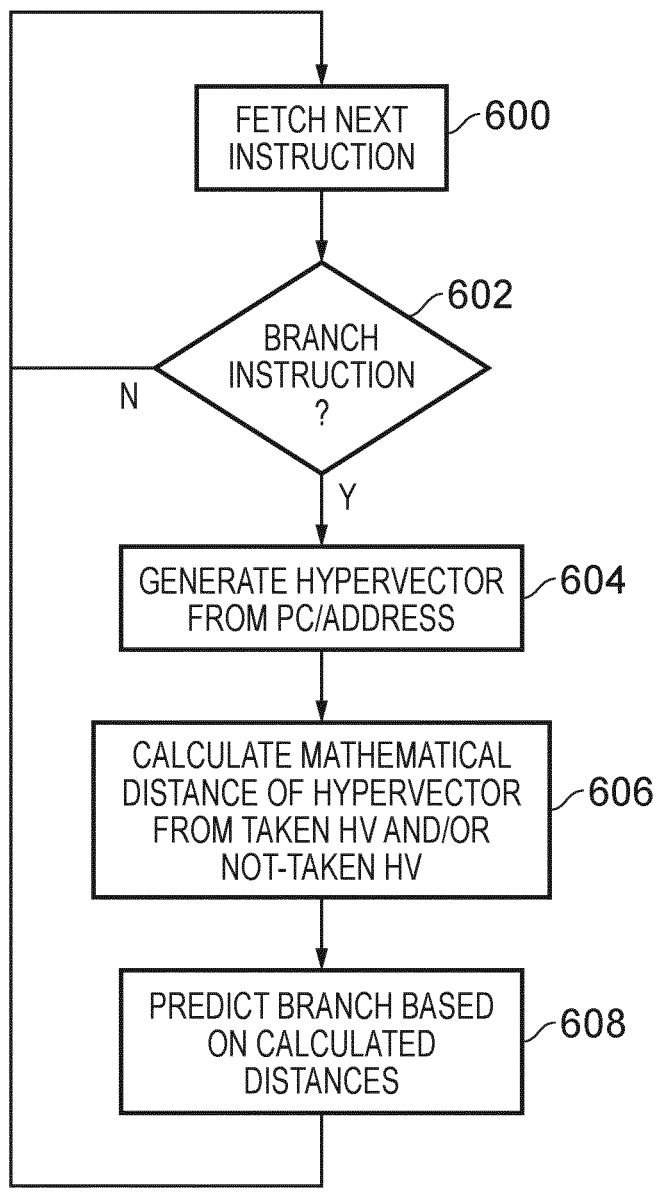
Figure 12:
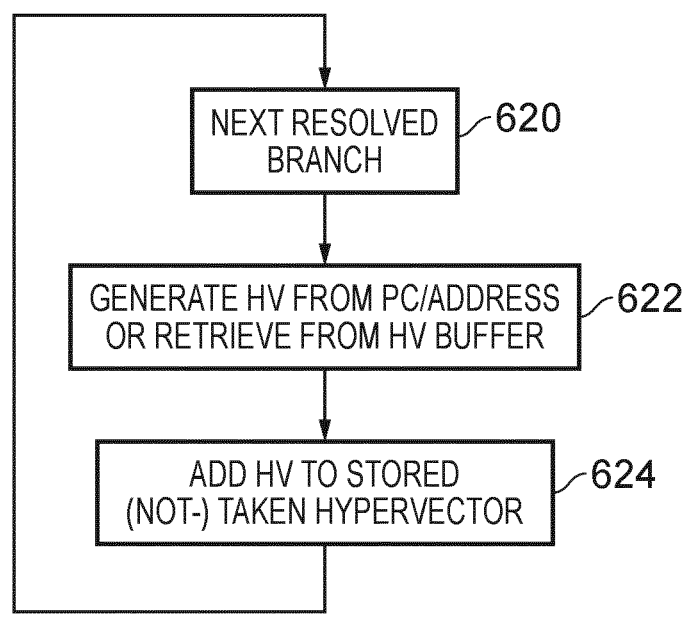

The present techniques will be described further, by way of example only, with reference to embodiments thereof as illustrated in the accompanying drawings, to be read in conjunction with the following description, in which:

FIG. 1 shows example frequency distributions for normalised mathematical distances between pairs of hypervectors with randomly set bits when the hypervectors comprise 100, 500, and 2,500 bits;

FIG. 2 schematically illustrates an example data processing apparatus which may support various examples of the present techniques;

FIG. 3 schematically illustrates an example fetch stage of an execution pipeline according to various examples the present techniques;

FIG. 4A schematically illustrates circuitry providing hypervector assignment and comparison according to various examples the present techniques;

FIG. 4B schematically illustrates circuitry providing hypervector updating according to various examples the present techniques;

FIG. 4C schematically illustrates circuitry providing hypervector generation, comparison, and updating according to various examples the present techniques;

FIG. 5A schematically illustrates circuitry providing hypervector assignment, combination, and comparison for a sequence of branch instructions according to various examples the present techniques;

FIG. 5B illustrates the manipulation of hypervectors in preparation for their combination according to various examples the present techniques;

FIG. 6A schematically illustrates circuitry providing hypervector assignment and combination for a sequence of branch instructions according to various examples the present techniques;

FIG. 6B schematically illustrates circuitry providing hypervector assignment, combination, and comparison for a sequence of branch instructions according to various examples the present techniques;

FIG. 7 schematically illustrates a branch prediction system comprising a base predictor and hypervector predictors for varying lengths of branch sequences according to various examples the present techniques;

FIGS. 8A and 8B schematically illustrate circuitry for hypervector comparison using charge accumulation according to various examples the present techniques;

FIG. 9 schematically illustrates circuitry providing hypervector updating according to various examples the present techniques;

FIG. 10 schematically illustrates circuitry providing a prediction hypervector on the basis of a pattern history and program counter bits according to various examples the present techniques;

FIG. 11 is flow diagram showing a sequence of steps which are taken according to various examples the present techniques; and FIG. 12 is flow diagram showing a sequence of steps which are taken according to various examples the present techniques.

In one example herein there is an apparatus comprising:
processing circuitry to perform data processing operations in response instructions, wherein the instructions comprises branch instructions;
branch prediction circuitry to generate a prediction with respect to a branch instruction of whether a branch specified by the branch instruction will be taken or not-taken; and
hypervector storage to store at least one of a taken hypervector and a not-taken hypervector,
wherein the processing circuitry is arranged to perform speculative instruction execution based on the prediction generated by the branch prediction circuitry,
and the branch prediction circuitry comprises hypervector generation circuitry to assign an arbitrary hypervector in deterministic dependence on an address of the branch instruction, wherein the hypervector comprises at least 500 bits,
wherein the branch prediction circuitry is responsive to a resolution of the branch specified by the branch instruction when the processing circuitry has executed the branch instruction to add the hypervector to the stored taken hypervector or the stored not-taken hypervector in dependence on the resolution of the branch,
and wherein the branch prediction circuitry is arranged to generate the prediction in dependence on a mathematical distance metric of the hypervector from the stored at least one of the taken hypervector and the not-taken hypervector.

The present techniques are inspired by the ideas of hyper-dimensional computing (HDC) and sparse distributed memories (SDM). The proposal of SDM was made by Pentti Kanerva as a model of human long term memory and is documented in his book "Sparse Distributed Memory", The MIT Press, ISBN: 9780262111324, November, 1988. According to the SDM approach, data can be stored in a content addressable way in very large vectors (where the literature suggests vectors of 10,000 elements), generally referred to herein as hypervectors. In this expanded form, all stored objects are defined by the values of their dimensions (providing a unique hash), where each element or bit of the hypervector is typically constrained to take a simple range of values, such as from the sets {−1,1} or {0,1}. This then presents an n-dimensional space comprised of the set of vectors, e.g. {−1,1}$^n$, where there are N=2$^n$ points in the space. For such a set of vectors, the probability of k bits having one of the possible states rather than the other (e.g. 1 rather than −1) is:

$$Pr(k) = \frac{\binom{n}{k}}{2^n}$$

A key observation for such sets of hypervectors is that, if two random hypervectors are compared, in high dimensionality (i.e. for hypervectors which have a large number of elements or bits), most randomly chosen pairs will have more than a third of their bits flipped with respect to one another. For instance when looking at 7-dimensional space it can be seen that 70 of the total 128 states have 3 or 4 permutations and that 99 out of 128 states have more than 2 bits being different. This means that for 7 bit vectors the probability that two random vectors have at least 2 permuted bits (22% of the vector) is 78%. Expanding this to 1,000 bits the probability that at least two thirds of two randomly selected vectors are different is more than 99.9999%. This can be calculated using the binomial distributions cumulative distribution function for equi-probable events:

$$F(k) = Pr(X > k) = \frac{\sum_{i=0}^{|k|} \binom{n}{i}}{2^n}$$

which gives confidence when using hypervectors of a thousand or more bits that pairs of hypervectors which are randomly assigned (in terms of their content) will be unique and far orthogonal with respect to one another with a high degree of certainty (above 99.999%). Conversely hypervectors that are relatively close to each other (have less than ⅓ of their bits different) are highly likely to be related as the probability of randomly being close to another vector is infinitesimal. Here the "relation" between the two hypervectors may for example be that both derive in some sense from the same source. For example, where a set of information, such as the visual input for a human when an object is observed, is mapped to a very large hypervector, if that hypervector is found to have fewer than ⅓ of its bits different to a previously stored hypervector also mapped from the human's visual input, this strongly suggests that both the previously stored hypervector and the current hypervector were derived from similar visual input.

The present techniques have recognised the opportunity to apply some of the features of HDC and SDM to branch prediction in a data processing circuitry which is arranged to perform data processing operations in response to instructions, where those instructions comprises branch instructions. For instruction throughput efficiency the data processor predicts the outcome of branches defined by the branch instructions it encounters in the instructions it executes and speculatively executes instructions on the basis of the predictions generated. That branch prediction capability is enhanced by the present techniques, which provide hypervector generation circuitry to assign an arbitrary hypervector in deterministic dependence on an address of each branch instruction. Here, for the purposes of this original disclosure, a hypervector is defined as comprising at least 500 bits, since it has been found that the benefits of the present techniques are accessible with hypervectors of such dimensionality, although it will be appreciated that in view of the discussion of probabilities above that certain characteristics of these techniques are further enhanced for hypervectors comprising more than 500 bits, such as 1000, 2500, or even 10,000 bits, say. These particular examples should not be interpreted as in any way limiting on the generality of applicability of the present techniques, although it should further be noted that the complexities and costs of handling such larger hypervectors naturally grow as those hypervectors take on ever larger dimensionalities. Where the hypervector generation circuitry assigns an arbitrary hypervector in deterministic dependence on an address of each branch instruction, it will be understood therefore that the hypervector assigned is arbitrary is the sense that each of its elements may take any of the possible values available for this hypervector space (e.g. −1 or 1), but that the deterministic dependence on the address of the branch instruction means that any time that particular address is provided to the hypervector generation circuitry it will always generate the same hypervector (i.e. having the same pattern of element content).

When a given branch resolves, the hypervector associated with the address of the relevant branch instruction is then added to the content of hypervector storage in dependence on the outcome (i.e. taken or not-taken). In some embodiments the apparatus is arranged to store just one of a taken hypervector and a not-taken hypervector, to which further confirmed outcomes are added which have the corresponding direction. For example hypervectors for branch addresses which resolved as taken are added to a stored taken hypervector. The branch prediction circuitry of the apparatus then makes use of the stored hypervector as further branch instructions are encountered by generating a hypervector in dependence on each branch instruction address and then determining a mathematical distance metric of the hypervector from the stored taken hypervector. If this mathematical distance metric conforms to a defined threshold (e.g. is below a given threshold), then this may be determined as a match and a prediction of taken for the branch can be made.

Otherwise it is predicted that the branch will not be taken. Clearly this example can be trivially inverted, such that only a not-taken hypervector is stored.

In some embodiments the hypervector storage is arranged to store the taken hypervector and the not-taken hypervector, wherein the branch prediction circuitry is responsive to a resolution of the branch specified by the branch instruction when the processing circuitry has executed the branch instruction to add the hypervector to either the stored taken hypervector or the stored not-taken hypervector in dependence on the resolution of the branch, and wherein the branch prediction circuitry is arranged to generate the prediction as taken when the mathematical distance metric of the hypervector from the stored taken hypervector is smaller than the mathematical distance metric of the hypervector from the stored not-taken hypervector and to generate the prediction as not-taken when the mathematical distance metric of the hypervector from the stored not-taken hypervector is smaller than the mathematical distance metric of the hypervector from the stored taken hypervector. Accordingly, both a taken hypervector and a not-taken hypervector are stored, and hypervectors associated with resolved branches are added to one or the other relevant stored hypervector in dependence on the resolved direction.

Although the hypervector generation circuitry may generate the hypervector in deterministic dependence an individual address of an individual branch instruction, in some embodiments the hypervector generation circuitry is arranged to generate the hypervector in deterministic dependence on a sequence of addresses of branch instructions. In this manner a more nuanced approach to branch prediction is supported, where the outcome of a branch is not predicted simply on the basis of that branch itself, but instead on the processing sequence, including multiple preceding branch outcomes. This is achieved by generating the prediction hypervector in deterministic dependence on a sequence of addresses of branch instructions (i.e. the sequence of branches which led to the current branch being predicted).

This dependence on a sequence of addresses of branch instructions may be variously implemented, but in some embodiments the hypervector generation circuitry is arranged to generate a respective hypervector for each address of the sequence of addresses of branch instructions and to combine the respective hypervectors to generate the hypervector.

The respective hypervectors may be variously combined, but in some embodiments the hypervector generation circuitry is arranged to combine the respective hypervectors to generate the hypervector by applying an element translocation to each hypervector, wherein a number of element positions by which each hypervector is translocated is dependent on a number of branches by which each branch is separated from a current branch subject of the branch prediction. For example this element rotation could be a "rightward" rotation, such that for each element shift the right-hand-most element of the hypervector is switched to being the left-hand-most element of the shifted hypervector. Thus for a branch which is only one step removed from the current branch, it may be the subject of only a single such element shift, whereas a branch which is n steps removed from the current branch, it may be the subject of n such element shifts, so that the n right-hand-most elements of the hypervector are switched to being the n left-hand-most elements of the shifted hypervector. Clearly the left/right labelling of the above example is arbitrary. Equally the translocation could be a shift, i.e. such that a similar operation to the above-described element rotation is performed, but without those elements which are shifted off one end of the hypervector being appended to the other end of the hypervector. This could be a right or a left shift. Shifting in this manner (as opposed to rotating) also provides that the branch history is also decreasingly influential on the current prediction, the further a given branch is (in branch sequence order) from the current branch being predicted.

In some embodiments the hypervector generation circuitry is arranged to generate the respective hypervector for each address of the sequence of addresses of branch instructions in further dependence on a direction bit indicative of whether the branch of each branch instruction was taken or not-taken. This then adds a further distinction or individualisation to each branch, such that handled in accordance with the present techniques, where branch addresses are mapped to arbitrary hypervectors, a given branch, when taken, is treated as differently when not-taken as an entirely different branch. This further supports the more detailed branch prediction provided, distinguishing still further between different execution histories which led to the present branch being predicted.

For any given sequence of branches, giving a corresponding sequence of hypervectors, the prediction hypervector generated from the combination of those hypervectors may be calculated by translating each branch address into its corresponding hypervector, possibly applying a rotation to each, and then combining. However it is not necessary for the full calculation to be performed for when each new branch instruction is encountered, and thus in some embodiments the hypervector generation circuitry is arranged to generate the hypervector by removing an oldest hypervector contribution from an oldest branch instruction from a preceding sequence of addresses of branch instructions and adding a newest hypervector contribution from a youngest branch instruction of the sequence of addresses of branch instructions. For example where the branch prediction is being generated for a given sequence length by the "addition" of a new hypervector for the youngest branch instruction, the length of the sequence is preserved by the "subtraction" of the oldest hypervector contribution from the combined hypervectors. There are various ways in which such "addition" and "subtraction" may be implemented as will be discussed in more detail below.

In some embodiments the stored hypervector (when only one of a taken and a not-taken hypervector are stored) or the stored hypervectors (when both a taken and a not-taken hypervector are stored) may be stored in multiple forms corresponding to a range of lengths of sequences of branches. Accordingly in such embodiments the hypervector storage is arranged to store the at least one of a taken hypervector and a not-taken hypervector for each of a range of lengths of sequences of addresses of branch instructions, and the branch prediction circuitry is arranged to generate the prediction in further dependence on a mathematical distance metric of the hypervector from the stored at least one of the taken hypervector and the not-taken hypervector for each of the lengths of sequences of addresses of branch instructions. This approach provides a still further breadth to the spread of different types of branch sequences which the apparatus can recognise. The lengths of each of the range of lengths of the branch sequences may in principle be of any size with respect to one another, although in some embodiments an efficient and effective use of the storage capacity available for this purpose has been found to be supported when the lengths are a geometric series (e.g. from at least some of the lengths: 2, 4, 8, 16, 32, 64 etc. to take just one example).

When such multiple lengths of branch sequences are supported, the selection between them make take various forms, but in some embodiments the branch prediction circuitry is arranged to generate the prediction based on a longest sequence of addresses of branch instructions for which the mathematical distance metric of the hypervector from the stored at least one of the taken hypervector and the not-taken hypervector exceeds a threshold.

The combination of two hypervectors may be performed in a variety of ways. This may for example take place when a resolved branch is used to update a stored hypervector (such as when a branch resolves as taken and the corresponding hypervector is added to the stored taken hypervector). Furthermore, the combination of the individual elements of each hypervector being combined may take different forms, which may depend on the manner in which each hypervector is defined. For example, in the case where each of the hypervectors is defined in the space $\{-1,1\}^n$ addition between hypervector elements may be defined as:

| Hypervector 1 | Hypervector 2 | Result Hypervector | Polarised result hypervector |
|---|---|---|---|
| 1 | 1 | 1 | 1 |
| 1 | −1 | 0 | X |
| −1 | 1 | 0 | X |
| −1 | −1 | 1 | −1 | where a polarisation function is applied to generate the final polarised result in which value X is randomly assigned to be either 1 or −1. Alternatively, in the case where each of the hypervectors is defined in the space $\{0,1\}^n$ addition between hypervector elements may be defined as:

| Hypervector 1 | Hypervector 2 | Result Hypervector | Polarised result hypervector |
|---|---|---|---|
| 1 | 1 | 1 | 1 |
| 1 | 0 | X | X |
| 0 | 1 | X | X |
| 0 | 0 | 0 | 0 | where a polarisation function is applied to generate the final polarised result in which value X is randomly assigned to be either 1 or 0.

Similarly when multiple hypervectors are combined a multiplication/XOR-type operation may be employed, which may for example take place when multiple hypervectors generated for each of a sequence of branches are combined. Once more the combination of the individual elements of each hypervector being combined may take different forms, which may depend on the manner in which each hypervector is defined. For example, in the case where each of the hypervectors is defined in the space $\{-1,1\}^n$ multiplication between hypervector elements may be defined as:

| Hypervector 1 | Hypervector 2 | Result Hypervector |
|---|---|---|
| 1 | 1 | 1 |
| 1 | −1 | −1 |
| −1 | 1 | −1 |
| −1 | −1 | 1 |

Alternatively, in the case where each of the hypervectors is defined in the space $\{0,1\}^n$ multiplication between hypervector elements may be defined as:

| Hypervector 1 | Hypervector 2 | Result Hypervector |
|---|---|---|
| 1 | 1 | 1 |
| 1 | 0 | 0 |
| 0 | 1 | 0 |
| 0 | 0 | 1 |

In some embodiments, when adding the hypervector to the stored taken hypervector or the stored not-taken hypervector in dependence on the resolution of the branch, the branch prediction circuitry is arranged to apply a value limitation function to each hypervector element. This limitation function may take the form of the constraints shown in the tables above. However it may also take the form of allowing an intermediate calculation of an element to take a value having a magnitude larger than that allowed by the hypervector space (e.g. of a magnitude greater than 1 for $\{-1,1\}^n$), because this allows greater variation in the divergence of an element from a "null" position, allowing for an effect of multiple reinforcement when corresponding elements from multiple hypervectors match, even though an anomalous instance contradicts this, before the limitation function is then applied to constrain the result element value to that of the defined hypervector space.

Accordingly in some embodiments the hypervector generation circuitry is arranged to generate the hypervector comprising elements each representing a value of either +1 or −1, and wherein the value limitation function maps:
positive values to +1;
negative values to −1; and
a value of 0 to a random selection of either +1 or −1.

In other embodiments the hypervector generation circuitry is arranged to generate the hypervector comprising elements each representing a value of either 1 or 0, and wherein the value limitation function constrains:
addition of two elements representing 1 to generate 1;
addition of two elements representing 0 to generate 0; and
addition of an element representing 1 and an element representing 0 to generate a random selection of either 1 or 0.

In the event that a branch prediction generated is found to have been incorrect the apparatus may simply take no action (as opposed to adding the corresponding hypervector to the stored taken/not-taken hypervector as appropriate). However in some embodiments the branch prediction circuitry is responsive to the resolution of the branch specified by the branch instruction, when the resolution indicates that the prediction generated by the branch prediction circuitry for the branch was a misprediction, to subtract the hypervector from either the stored taken hypervector or the stored not-taken hypervector in dependence on the resolution of the branch.

In some embodiments the branch prediction circuitry is responsive to the resolution of the branch specified by the branch instruction when the processing circuitry has executed the branch instruction to add a subset of elements of the hypervector to a subset of elements of either the stored taken hypervector or the stored not-taken hypervector in dependence on the resolution of the branch. Thus instead of the whole hypervector corresponding to the resolved branch being added to the stored hypervector, only a subset of the elements of the stored hypervector may be updated on the basis of a corresponding subset of the elements of the hypervector associated with the resolved branch instruction. This lessens the effect on the stored hypervector of the update using the hypervector associated with the resolved branch instruction (to an extent dependent on the proportion of the whole hypervector which the subset covers). Accordingly this technique smooths out the effect of short term fluctuations in the outcome of branches and means that longer term statistical stability of a certain outcome of a certain branch will dominate. The subset may be chosen in size dependent on the degree to which this "noise-filter" effect is desired and further the elements which comprise the subset of elements may be predefined or may selected in a varying (possibly randomized) fashion.

In further support of this technique, in some embodiments the branch prediction circuitry is arranged to add a further subset of elements of the hypervector comprising randomised values to a further subset of elements of either the stored taken hypervector or the stored not-taken hypervector in dependence on the resolution of the branch, wherein the subset of elements and the further subset of elements are mutually exclusive. Randomisation of a subset of elements also has the effect of diluting the effect that the addition of a given hypervector will have on the stored hypervector.

The comparison between hypervectors, for example the comparison between a prediction hypervector and at least one of a stored taken hypervector and a stored not-taken hypervector, may be variously implemented. A popcount approach may be taken, however in particular in the case of larger hypervectors, the time taken for such an approach to be carried out may become undesirably long. In this context the present techniques propose that the branch prediction circuitry comprises analogue mathematical distance metric determination circuitry comprising hypervector comparison couplings arranged selectively to apply a per-element charge to a charge accumulation line, wherein each hypervector comparison coupling is responsive to a respective element of the hypervector matching a respective element of the stored at least one of the taken hypervector and the not-taken hypervector to apply the per-element charge to the charge accumulation line, and an accumulated charge on the charge accumulation line above a threshold charge is interpreted as a hypervector match. This analogue approach has been found to allow a timely determination of a taken or not-taken prediction, which is further supported by the characteristic of the hypervector approach used that perfect accuracy in the determination of each individual element is not required.

In some embodiments the branch prediction circuitry comprises branch history storage responsive to the branch instruction to store a branch history indication of whether the branch instruction has previously been taken or not-taken,
wherein the branch prediction circuitry is arranged to generate a combination of the branch history indication and an indication of the address of the branch instruction and to cause the hypervector generation circuitry to generate a further hypervector in deterministic dependence on the combination,
and wherein the branch prediction circuitry is arranged to generate a further prediction in dependence on a mathematical distance metric of the further hypervector from the stored at least one of the taken hypervector and the not-taken hypervector.

The mathematical distance metric used may take a variety of forms. In some embodiments the mathematical distance metric uses a dot product between the hypervectors compared. In some embodiments the mathematical distance metric uses a cosine similarity. In some embodiments the mathematical distance metric is a Hamming distance.

In one example herein there is a method of branch prediction comprising:
performing data processing operations in response instructions, wherein the instructions comprises branch instructions;
generating a prediction with respect to a branch instruction of whether a branch specified by the branch instruction will be taken or not-taken;
storing at least one of a taken hypervector and a not-taken hypervector;
performing speculative instruction execution based on the prediction generated;
assigning an arbitrary hypervector in deterministic dependence on an address of the branch instruction, wherein the hypervector comprises at least 500 bits;
adding the hypervector to the stored taken hypervector or the stored not-taken hypervector in dependence on a resolution of the branch when the branch instruction has been executed; and generating the prediction in dependence on a mathematical distance metric of the hypervector from the stored at least one of the taken hypervector and the not-taken hypervector.

In one example herein there is an apparatus comprising:

means for performing data processing operations in response instructions, wherein the instructions comprises branch instructions;

means for generating a prediction with respect to a branch instruction of whether a branch specified by the branch instruction will be taken or not-taken;

means for storing at least one of a taken hypervector and a not-taken hypervector;

means for performing speculative instruction execution based on the prediction generated;

means for assigning an arbitrary hypervector in deterministic dependence on an address of the branch instruction, wherein the hypervector comprises at least 500 bits;

means for adding the hypervector to the stored taken hypervector or the stored not-taken hypervector in dependence on a resolution of the branch when the branch instruction has been executed; and means for generating the prediction in dependence on a mathematical distance metric of the hypervector from the stored at least one of the taken hypervector and the not-taken hypervector.

Some particular embodiments are now described with reference to the figures.

A key feature of the hypervectors employed by the present techniques, where for the present purposes a hypervector is considered to be a set of at least 500 elements, in particular when the elements of such a hypervector are arbitrarily assigned, is the far orthogonality which a pair of such arbitrarily assigned hypervectors exhibits with respect to one another. One measure of this orthogonality is the mathematical distance between the two hypervectors, for example the Hamming distance between them. FIG. 1 shows example frequency distributions for normalised mathematical distances between pairs of hypervectors with randomly set bits when the hypervectors comprise 100, 500, and 2,500 bits. Where each element (e.g. bit) of each hypervector is effectively randomly set the probability that two randomly chosen hypervectors have at least 2 permuted bits can be calculated using the binomial distributions cumulative distribution function for equi-probable events:

$$F(k) = Pr(X > k) = \frac{\sum_{i=0}^{|k|} \binom{n}{i}}{2^n}$$

which, for example in the case of hypervectors of 1,000 bits, gives a probability that at least two thirds of two randomly selected vectors are different of greater than 99.9999%. As can be seen in FIG. 1, the greater the number of bits of the hypervector (examples of 100, 500, and 2,500 bit hypervectors are given), the more sharply pronounced the frequency peaks at a normalised distance of 0.5. Clearly for even larger hypervector sizes the normalized distance distribution becomes ever more tightly aligned with 0.5. Put otherwise, the larger the hypervector size used the nearer and nearer arbitrary individual hypervectors become to being to all intents and purposes fully orthogonal to one another.

FIG. 2 schematically illustrates an example data processing apparatus 10 which may support various examples of the present techniques. In a manner with which one of ordinary skill in the art is familiar, the apparatus 10 has a pipelined configuration according to which instructions retrieved from memory pass through a series of pipeline stages. In the high-level illustration of FIG. 2 these are represented by the fetch circuitry 12, the decode circuitry 14, the issue circuitry 16, the execution circuitry 18, and retirement circuitry 20. Fetch control circuitry 22 of the fetch circuitry 12 causes instructions to be retrieved from storage in memory 30, which instructions are cached in a cache hierarchy shown in the representation of FIG. 2 to comprise L2 cache 32 and instruction cache 34 (other cache levels and structures may be present or substituted). Fetched instructions are passed to the decode stage 14 for decoding, before being queued for issue by the issue stage 16 to the execution stage 18. It will be appreciated that the highly-simplified representation of FIG. 2 only presents a cursory and abstracted representation of an execution pipeline, since only the generalities of the relevant context need to be presented for the purposes of the present disclosure. Generally however, the execution circuitry 18 (including various functional units—not explicitly shown) executes the data processing operations defined by the instructions being executed, where these operations are performed with respect to data items temporarily held in the register file 24. Data items required to be the subject of data processing operations are retrieved from memory 30 and cached in the data cache hierarchy represented by the L2 cache 32 and the L1 data cache 36 in FIG. 2 (other cache levels and structures may be present or substituted). Of particular relevance to the present techniques is the fact that the apparatus 10 is arranged to perform speculative instruction execution, in support of which the fetch circuitry 12 comprises branch prediction circuitry 40. The branch prediction circuitry is arranged to generate branch predictions with respect to branch instructions fetched by the fetch circuitry 12. These branch predictions are based on the previous outcomes of the same branch instructions, in support of which branch resolution circuitry 42 in the retire stage 20 indicates the resolved outcome of branches to the branch prediction circuitry 40 and the fetch control circuitry 22. In implementation of the present techniques the branch prediction circuitry 40 has access to hypervector storage 44. Hypervector storage 44 is schematically illustrated separate from the branch prediction circuitry 40 in the example apparatus of FIG. 2, yet in other examples the hypervector storage may form part of the branch prediction circuitry 40 or may be provided elsewhere in the apparatus. The manner in which the branch prediction circuitry 40 makes use of hypervectors in generating branch predictions will be described in more detail with reference to the figures which follow. However in only brief summary here the branch prediction circuitry 40 generates an arbitrary hypervector in deterministic dependence on the branch instruction (e.g. on its program address or program counter value). This hypervector is then compared with one or both of a "taken" hypervector and a "not-taken" hypervector stored in the HV storage 44. Whether a prediction of taken or not taken is made is dependent on a mathematical distance of the generated hypervector from one or both of the stored "taken" hypervector and the stored "not-taken" hypervector. Further, when the resolution of a given branch is signalled by the branch resolution circuitry 42 to the branch prediction circuitry 40, the corresponding hypervector for the relevant branch instruction is added to the "taken" hypervector or the "not-taken" hypervector stored in the HV storage 44 as appropriate.

FIG. 3 schematically illustrates fetch circuitry 100 in accordance with some embodiments. This fetch circuitry 100 may for example provide the fetch circuitry 12 illustrated in FIG. 2. The fetch circuitry 100 comprises branch prediction circuitry 102, hypervector storage 104, and fetch control circuitry 106. Branch prediction circuitry 102 comprises hypervector assignment circuitry 108 and hypervector comparison circuitry 110. The hypervector assignment circuitry 108 is arranged to receive an indication of a branch instruction address (which may be in the form of the address itself, as a program counter, etc.) and in deterministic dependence on to generate a hypervector. The generation of hypervectors by the hypervector assignment circuitry 108 is deterministic in that a given branch instruction address will always result in the same hypervector. Hypervectors are also arbitrarily assigned, i.e. such that the individual elements of each hypervector do not carry any particular meaning, but rather the combination of individual elements making up each hypervector provides a unique identifier in the hypervector space. A hypervector thus generated by the hypervector assignment circuitry 108 is provided to the hypervector comparison circuitry 110, which compares the hypervector to a taken hypervector 112 and to a not-taken hypervector 114 stored in the hypervector storage 104. In particular the hypervector comparison circuitry 110 determines a mathematical distance between the hypervector and the stored taken hypervector 112 and not-taken hypervector 114. On the basis of the smaller mathematical distance thus found, the hypervector comparison circuitry 110 then generates either a taken or a not-taken prediction. Note that in some embodiments only one of a taken hypervector and a not-taken hypervector is used and the hypervector comparison circuitry 110 is then arranged to generate the branch prediction on the basis of a comparison between the mathematical distance between the hypervector and (say) a stored taken hypervector, where if the distance is at or below given threshold the branch is predicted as taken, whereas if the distance is above that given threshold then the branches predicted as not taken.

The hypervector storage 104 is shown to further comprise hypervector update control circuitry 116 which receives indications of branch resolutions. Having received the indication of a resolution of a given branch instruction, hypervector update control circuitry 116 makes use of the hypervector assignment circuitry 108 of the branch prediction circuitry 102 to generate the corresponding hypervector for this branch instruction address and then updates one of the stored taken hypervector 112 and the stored not-taken hypervector 114. For example when the branch is indicated as taken the taken hypervector 112 is updated. In the case where only one of the taken hypervector 112 and the not-taken hypervector 114 is stored, the hypervector update control 116 performs the update when the direction matches (e.g. taken branches are added to a stored taken hypervector) and performs no update when the direction does not match (e.g. not-taken branches are ignored when only a taken hypervector is stored). Further ways in which one or more stored hypervectors may be updated on the basis of branch resolutions are discussed in more detail below with reference to the figures.

FIG. 4A schematically illustrates hypervector assignment circuitry 150 and hypervector comparison circuitry 152 which in some embodiments may form the hypervector assignment circuitry 108 and the hypervector comparison circuitry 110 shown in FIG. 3. The hypervector assignment circuitry 150 comprises hypervector generation circuitry 154 which makes use of an expanding hash function 156 in order to generate arbitrarily assigned hypervectors in deterministic dependence on the indications of branch instruction addresses received. Hypervector comparison circuitry 152 comprises mathematical distance calculation circuitry 158 and comparison control 160. On receipt of a hypervector generated by the hypervector assignment circuitry 150, the comparison control circuitry 160 of the hypervector comparison circuitry 152 accesses hypervector storage 162 and a hypervector stored therein is provided to the mathematical distance calculator 158. A mathematical distance between the two hypervectors is then determined. The particular mathematical distance metric may vary between embodiments. It may generally be thought of as a dot product or cosine similarity between the hypervectors compared. It may for example be implemented as a Hamming distance. On the basis of the mathematical distance, the hypervector comparison circuitry 152 then generates either a taken or a not-taken prediction. As for the embodiment for FIG. 3, this may be based on just one distance from a stored hypervector or may be based on a comparison of distances calculated with respect to more than one stored hypervector.

FIG. 4B schematically illustrates example hypervector updating circuitry 170, which in some embodiments may provide the hypervector update control 116 of the embodiment shown in FIG. 3. The hypervector update circuitry 170 comprises update control 172 and hypervector addition/subtraction/normalisation circuitry 174. The update control circuitry 172 receives information relating to branch resolution. Specifically it receives an indication of the relevant branch instruction address, as well as an indication of whether the branch was taken or not taken and an indication of whether the prediction made for this branch as it entered the pipeline was correct or not. On the basis of this information the update control 172 orchestrates an update to a hypervector stored in the hypervector storage 176. The update control circuitry 172 has access to the hypervector assignment circuitry 178, such that for a given branch instruction address the corresponding hypervector can be obtained. The update control circuitry 172 controls the hypervector addition/subtraction/normalisation circuitry 174 so that the hypervector of the branch instruction is then used to update the stored hypervector. For example, in embodiments in which the hypervector storage 176 stores a taken and a not taken hypervector, the current hypervector for the branch instruction being processed may then be added to the relevant stored hypervector (depending on whether the branch was in fact taken or not taken). This may be set as the manner of operating in the absence of an indication of whether a prediction for this branch was correct or incorrect. However, the indication of the prediction correctness may also be made use of. For example in the case where a branch prediction proves to be incorrect, whilst an addition to the relevant stored hypervector could still be made, hypervector update performed may also subtract the current hypervector from the stored hypervector corresponding to the incorrect prediction.

The addition of a current hypervector to a stored hypervector in the example is carried out according to an addition and polarization technique. In some embodiments the hypervectors have elements which are members of the set $\{-1,1\}$ and the addition between hypervector elements is defined as:

| Hypervector 1 | Hypervector 2 | Result Hypervector | Polarised result hypervector |
|---|---|---|---|
| 1 | 1 | 1 | 1 |
| 1 | −1 | 0 | X |

-continued

| Hypervector 1 | Hypervector 2 | Result Hypervector | Polarised result hypervector |
|---|---|---|---|
| −1 | 1 | 0 | X |
| −1 | −1 | −1 | −1 | where a polarisation function is applied to generate the final polarised result in which value X is randomly assigned to be either 1 or -1. In embodiment where each of the hypervectors has elements which are members of the set {0,1}, addition between hypervector elements is defined as:

| Hypervector 1 | Hypervector 2 | Result Hypervector | Polarised result hypervector |
|---|---|---|---|
| 1 | 1 | 1 | 1 |
| 1 | 0 | X | X |
| 0 | 1 | X | X |
| 0 | 0 | 0 | 0 | where a polarisation function is applied to generate the final polarised result in which value X is randomly assigned to be either 1 or 0. In either example the result of the additions can be seen to be "normalised" by the limits placed on the values which each element can take, but where the "direction" or polarity of each element is preserved.

FIG. 4C schematically illustrates example hypervector handling circuitry, which in some embodiments may provide the branch prediction circuitry 102 and the hypervector storage 104 of the embodiment shown in FIG. 3. The branch prediction circuitry comprises hypervector generation 180 which makes use of an expanding hash function 181 in order to generate arbitrarily assigned hypervectors in deterministic dependence on the indications of branch instruction addresses received. Hypervector comparison circuitry 182 comprises mathematical distance calculation circuitry 183, which receives a hypervector generated by the hypervector generation circuitry 180, and at least one stored hypervector which is retrieved from the hypervector storage 185 (holding a taken hypervector 186 and a not taken hypervector 187) by the hypervector retrieval and update circuitry 184. In this example both the taken hypervector and the not taken hypervector are retrieved and the mathematical distance calculation circuitry 183 determines which is closer to the generated hypervector. On this basis a taken (T) or not taken (NT) prediction is issued. The generated hypervector is also buffered in the hypervector buffer 188, held there until the branch resolves. On the resolution of the branch, the hypervector retrieval and update circuitry 184 takes the buffered hypervector from the hypervector buffer 188 and updates at least one of the stored taken hypervector 186 and the not taken hypervector 187 in dependence on the branch outcome. In the case of a correct branch prediction, the buffered hypervector may be added to the corresponding stored hypervector (of the correct prediction). In the case of an incorrect branch prediction, the buffered hypervector may be subtracted from the corresponding stored hypervector (of the incorrect prediction).

FIG. 5A schematically illustrates circuitry comprising hypervector assignment circuitry 200, hypervector combination circuitry 202, and hypervector comparison circuitry 204. The hypervector combination circuitry 202 and hypervector comparison circuitry 204 may be provided as the hypervector comparison circuitry 110 in the example of FIG. 3 or in association the hypervector comparison circuitry 152 in the example of FIG. 4A. Importantly, the arrangement of the hypervector combination circuitry 202 provides the apparatus with the capability to provide branch predictions on the basis of a sequence of branches. Whilst it may be more difficult to provide consistently reliable branch predictions on the basis of individual branch instructions, since the outcome of a given branch may depend more strongly on the context in which it is executed, a branch instruction at the end of a sequence of branch instructions may be more reliably predicted, since the particular sequence of branch outcomes which led to it in effect provides more specific context. The example configuration shown in FIG. 5A shows one example of how a sequence of branch instructions may be used in this manner. The example of a sequence of four branches is shown for simplicity and clarity of illustration, the present techniques are not limited to any particular number of branches in a sequence for which a prediction might be generated. As described above hypervector assignment circuitry 200 generates a hypervector on the basis of a received indication of a branch instruction (a program counter (PC) value in this example). This hypervector provides the current hypervector 205. A sequence of hypervectors 205, 206, 207, 208 corresponding to a sequence of branches is thus generated and held. These hypervectors are then combined by hypervector combination circuitry 210 into a single hypervector which is then passed to hypervector comparison circuitry 2044 comparison to one or more stored hypervectors as described elsewhere herein. The combination of hypervectors may be implemented by an XOR-type operation for the respective elements of the hypervectors being combined. Additionally a vector rotation may be applied to each hypervector, where the number of positions by which each is rotated is given by its position in the sequence of branches. Thus a sequence of branches $PC_1 \rightarrow PC_2 \rightarrow PC_3 \rightarrow PC_4$ may be combined as: $HV_4 \lll 3 \; HV_3 \lll 2 \; HV_2 \lll 1 \; HV_1$ where $\oplus$ denotes the XOR operation and $\lll[x]$ is a vector rotation by [x] element positions. The accuracy of the prediction may be enhanced by not only using the PC for each branch, but also including outcomes for each branch (as shown by the input to the HV assignment circuitry 200). FIG. 5B illustrates the manipulation of hypervectors by vector rotation in preparation for their combination, wherein hypervector 220 is not rotated, hypervector 221 is rotated by one element position, and hypervector 222 is rotated by two element positions. Arbitrarily more hypervectors might clearly be added to this sequence, with a further element position rotation applied to each. The combination of the hypervectors can then be performed (in this {1, −1} representation) by multiplication of the respective elements, where the outcome is defined as:

| Hypervector 1 | Hypervector 2 | Result Hypervector |
|---|---|---|
| 1 | 1 | 1 |
| 1 | −1 | −1 |
| −1 | 1 | −1 |
| −1 | −1 | 1 |

Alternatively, in the case where the hypervectors are in a binary {0,1} representation the outcome may be defined as:

| Hypervector 1 | Hypervector 2 | Result Hypervector |
|---|---|---|
| 1 | 1 | 1 |
| 1 | 0 | 0 |
| 0 | 1 | 0 |
| 0 | 0 | 1 |

FIG. 6A schematically illustrates circuitry providing hypervector assignment and combination a sequence of branch instructions according to some embodiments. The present techniques recognise that when a set of hypervectors (corresponding to a sequence of branches) is combined it is not necessary for the full calculation of the combination to be performed at each iteration. Instead, the contribution of the oldest hypervector can be removed and a contribution of the youngest hypervector can be added. Accordingly the next branch PC received by hypervector assignment circuitry 250 provides a new hypervector (HV) and the new branch PC is also pushed into the branch PC FIFO 251. The same time the oldest branch PC held is then popped from the FIFO 251 and its HV is determined by the HV assignment circuitry 250 to give the oldest HV. The combined HV calculation circuitry 252 (further comprising shift/multiplication functionality 254) then removes the contribution from the oldest HV from the current sequence HV 253. This is done by multiplying the oldest HV with the current sequence (in the {1, −1} representation) or by XORing (in the binary {0, 1} representation). The new HV can then be combined with the result of this operation (again by multiplication/XOR as appropriate) with a single element position shift.

Nevertheless the present techniques further recognise that it is not necessary for the sequence of PCs of the branches to be maintained and FIG. 6B schematically illustrates hypervector assignment circuitry 260, HV calculation circuitry 262, and calculation control circuitry 264 which support this. As in the case of FIG. 6A, most of the calculation of the combined hypervectors remains unchanged and only the oldest hypervector contribution is removed. The remainder is rotated by one element position for combination with the new hypervector. Additionally here, instead of the branch PC FIFO 251 of the FIG. 6A example, here the calculation control circuitry 274 keeps track of only the oldest PC and its outcome 266. When a next oldest PC is required, calculation control circuitry accesses the program by program access 268 to trace the program from the oldest PC with its recorded outcome to find the next branch. It is to be noted that the search for the next PC can be done off the critical path before the next branch arrives, and thus need not slow down the process. The HV calculation circuitry 262 comprises shift/multiplication circuitry 270 which operates on the HVs received and the current sequence HV 272 to perform the above operations.

FIG. 7 schematically illustrates a branch prediction system comprising a base predictor 300 and multiple hypervector predictors 301, 302, 303 for varying lengths of branch sequences according to some embodiments. The base predictor 300 may be variously configured. For example, the base predictor 300 may be provided in the form of any known branch prediction technique (such as based on saturating counters, using a pattern history table, and so on). In parallel to this base predictor 300, multiple hypervector predictors 301, 302, 303 are provided (where only three are explicitly illustrated, but the ellipsis indicates that an arbitrary number of these hypervector predictors might be present). The multiple hypervector predictors 301, 302, 303 are arranged to provide predictions on the basis of sequences of branches (as for example described above with reference to FIGS. 5A, 5B, 6A, and 6B), where each of the multiple hypervector predictors 301, 302, 303 corresponds to a branch sequence of a different length. Each hypervector predictor 301, 302, 303 maintains a taken hypervector corresponding to the hypervectors of sequences of branches of different length which concluded with a taken branch. In some embodiments there may be no particular relationship between the respective lengths of the sequences of branches, but in the example shown in FIG. 7 the sequence lengths are taken from a geometric sequence (e.g. 2, 4, 8, 16, 32, 64, etc) and thus could for example correspond to branch sequences of 4, 8, and 16 branches were only three hypervector predictors to be provided. This has been found to provide an efficient manner to make use of the circuitry area and storage capacity required, whilst covering branch sequences of a range of lengths. Output from each of the base predictor 300 and the multiple hypervector predictors 301, 302, 303 is passed to the prediction selection circuitry 305, which on the basis of the information received generates the overall prediction of taken or not-taken. The prediction selection circuitry can be arranged to select the prediction in a range of ways. For this purpose each of the multiple hypervector predictors 301, 302, 303 can provide the mathematical distance which they determine with respect to their respective stored taken hypervectors. The prediction selection circuitry may then select the prediction with the smallest calculated distance. The prediction selection circuitry may also take the respective branch sequence lengths into account, to preferentially select a prediction made with respect to a longer branch sequence. For example a threshold distance against which each calculated distance is compared may vary between the multiple hypervector predictors 301, 302, 303. The longest branch sequence for which the threshold is exceeded is then selected. Generally the output of the multiple hypervector predictors 301, 302, 303 can be preferentially selected over the output of the base predictor 300, and only in the case when none of the multiple hypervector predictors 301, 302, 303 generates a satisfactory distance is the output of the base predictor 300 used.

The calculation of the mathematical distance between hypervectors may in principle be carried out in a variety of ways. For example, a pop count mechanism could be used. However the present techniques further recognise that in the context of calculations relating to hypervectors with larger element counts, such mechanisms may become undesirably slow. In this context an analogue equivalent circuit is provided and FIGS. 8A and 8B schematically illustrate two examples of circuitry for hypervector comparison using charge accumulation. In FIG. 8A the mathematical distance determination circuitry 400 comprises a set of transistors 401, where the number of transistors corresponds to the number of elements of the hypervector. The stored taken hypervector bits ($HV_T$) are connected to the gates of this sequence of transistors and the prediction hypervector (Q) being used is connected to their respective sources. Matching elements thus cause charge to be added to the charge accumulation line 420, which is coupled to current threshold comparison circuitry 430. The current threshold comparison circuitry determines if the charge accumulated on the charge accumulation line 420 exceeds a defined threshold within a defined time period. If it does, this indicates a sufficient match between the stored taken hypervector bits ($HV_T$) and the prediction hypervector (Q) and on this basis the prediction of taken or not-taken can be made.

In the variant shown in FIG. 8B the mathematical distance determination circuitry 450 comprises two sets of transistors 451, 452, where in each set the number of transistors corresponds to the number of elements of the hypervector. The stored taken hypervector bits ($HV_T$) are connected to the gates of the first sequence of transistors 451 and the prediction hypervector (Q) 453 being used is connected to their respective sources. The stored not-taken hypervector bits ($HV_{NT}$) are connected to the gates of the second sequence of transistors 452 and the prediction hypervector (Q) 453 being used is connected to their respective sources. Matching elements in the taken case thus cause charge to be added to the charge accumulation line 460, whilst matching elements in the not-taken case thus cause charge to be added to the charge accumulation line 470. Both charge accumulation lines are coupled to current threshold comparison circuitry 480. The current threshold comparison circuitry determines which charge accumulation line has accumulated sufficient charge to exceed a defined threshold (which may also be constrained to be within a defined time period). On this basis the prediction of taken or not-taken can be made.

FIG. 9 schematically illustrates hypervector updating circuitry 500 according to some embodiments. As described above, the outcome of resolved branches is used to update one of a stored taken hypervector and a stored not taken hypervector. Update control circuitry 501 of the hypervector updating circuitry 500 receives an indication of a branch outcome together with an indication of the corresponding branch address. Access is made to hypervector buffer 502 in order to retrieve the corresponding hypervector on the basis of branch address. This retrieved hypervector is received by the subset randomisation circuitry 503 which is arranged to randomise a subset of the elements of the hypervector before it is passed to the addition/subtraction/normalisation circuitry 504, which then applies the thus-modified hypervector to a stored hypervector in the hypervector storage 505. Applying a randomisation to a subset of the elements of the hypervector introduces a variety of decay mechanism that effectively omits some of the bits from the prediction vector when it is added to be taken or the not taken hypervector. In an alternative embodiment, the subset of the elements is simply not applied as part of the addition or subtraction carried out with respect to the stored hypervector. This improves the accuracy of the prediction, because it lessens the effect of a misprediction which could in some cases potentially swing the predictor out of balance and invert the prediction.

FIG. 10 schematically illustrates circuitry providing a prediction hypervector on the basis of a pattern history and program counter bits in some example embodiments. The program counter (PC) bits are used to index into a pattern history storage 550, where the pattern history storage is updated on the basis of branch history patterns observed according to known techniques. However the output of the pattern history storage 550, for example in the form of a 2-bit history, is then combined with the program counter bits by combination circuitry 555 to then form a "modified PC" which is used as the input to the hypervector generator (encoder) 560. The hypervector generator 560 then produces the prediction hypervector which may then be applied in any of the embodiment described herein.

FIG. 11 is flow diagram showing a sequence of steps which are taken according to some example embodiments. The flow can be considered to begin at step 600 where the next instruction is fetched. It is then determined at step 602 if this is a branch instruction and when it is not the flow loops back to step 600. However for branch instructions the flow proceeds to step 604, where a hypervector is generated on the basis of the branch instruction address (e.g. using the address itself or using a corresponding PC value). Then at step 606 a mathematical distance of this hypervector is calculated with respect to either or both of a taken hypervector and a not taken hypervector which have previously been stored. At step 608 the outcome of this branch is predicted on the basis of the mathematical distance(s) calculated at step 606. The flow then returns to step 600.

FIG. 12 is flow diagram showing a sequence of steps which are taken according to some example embodiments, in particular with a respect to the handling of resolved branch instructions. At step 620 information concerning a next resolved branch is available and at step 622 a hypervector is either generated on the basis of the branch instruction address (or equivalent PC value) or retrieved from a hypervector buffer. At step 624 the generated or retrieved hypervector is then added to either a stored hypervector or the stored not-taken hypervector in dependence on the indicated outcome of that branch. The flow then returns to step 620.

In brief overall summary, apparatuses and methods for branch prediction are provided. Branch prediction circuitry generates prediction with respect to branch instructions of whether those branches will be taken or not-taken. Hypervector generation circuitry assigns an arbitrary hypervector in deterministic dependence on an address of each branch instruction, wherein the hypervectors comprises at least 500 bits. Upon the resolution of a branch a corresponding hypervector is added to a stored taken hypervector or a stored not-taken hypervector in dependence on the resolution of the branch. The branch prediction circuitry generates a prediction for a branch instructions in dependence on a mathematical distance metric of a hypervector generated for that branch instruction from the stored taken hypervector or the not-taken hypervector.

The following clauses define various configurations according to the present techniques:

Clause 1. Apparatus comprising:
processing circuitry to perform data processing operations in response instructions, wherein the instructions comprises branch instructions;
branch prediction circuitry to generate a prediction with respect to a branch instruction of whether a branch specified by the branch instruction will be taken or not-taken; and
hypervector storage to store at least one of a taken hypervector and a not-taken hypervector,
wherein the processing circuitry is arranged to perform speculative instruction execution based on the prediction generated by the branch prediction circuitry,
and the branch prediction circuitry comprises hypervector generation circuitry to assign an arbitrary hypervector in deterministic dependence on an address of the branch instruction, wherein the hypervector comprises at least 500 bits,
wherein the branch prediction circuitry is responsive to a resolution of the branch specified by the branch instruction when the processing circuitry has executed the branch instruction to add the hypervector to the stored taken hypervector or the stored not-taken hypervector in dependence on the resolution of the branch,
and wherein the branch prediction circuitry is arranged to generate the prediction in dependence on a mathematical distance metric of the hypervector from the stored at least one of the taken hypervector and the not-taken hypervector.

Clause 2. The apparatus as claimed in clause 1, wherein the hypervector storage is arranged to store the taken hypervector and the not-taken hypervector, wherein the branch prediction circuitry is responsive to a resolution of the branch specified by the branch instruction when the processing circuitry has executed the branch instruction to add the hypervector to either the stored taken hypervector or the stored not-taken hypervector in dependence on the resolution of the branch, and wherein the branch prediction circuitry is arranged to generate the prediction as taken when the mathematical distance metric of the hypervector from the stored taken hypervector is smaller than the mathematical distance metric of the hypervector from the stored not-taken hypervector and to generate the prediction as not-taken when the mathematical distance metric of the hypervector from the stored not-taken hypervector is smaller than the mathematical distance metric of the hypervector from the stored taken hypervector.

Clause 3. The apparatus as claimed in any preceding clause, wherein the hypervector generation circuitry is arranged to generate the hypervector in deterministic dependence on a sequence of addresses of branch instructions.

Clause 4. The apparatus as claimed in clause 3, wherein the hypervector generation circuitry is arranged to generate a respective hypervector for each address of the sequence of addresses of branch instructions and to combine the respective hypervectors to generate the hypervector.

Clause 5. The apparatus as claimed in clause 4, wherein the hypervector generation circuitry is arranged to combine the respective hypervectors to generate the hypervector by applying an element translocation to each hypervector, wherein a number of element positions by which each hypervector is translocated is dependent on a number of branches by which each branch is separated from a current branch subject of the branch prediction.

Clause 6. The apparatus as claimed in any of clauses 3-5, wherein the hypervector generation circuitry is arranged to generate the respective hypervector for each address of the sequence of addresses of branch instructions in further dependence on a direction bit indicative of whether the branch of each branch instruction was taken or not-taken.

Clause 7. The apparatus as claimed in any of clauses 3-6, wherein the hypervector generation circuitry is arranged to generate the hypervector by removing an oldest hypervector contribution from an oldest branch instruction from a preceding sequence of addresses of branch instructions and adding a newest hypervector contribution from a youngest branch instruction of the sequence of addresses of branch instructions.

Clause 8. The apparatus as claimed in any of clauses 3-7, wherein the hypervector storage is arranged to store the at least one of a taken hypervector and a not-taken hypervector for each of a range of lengths of sequences of addresses of branch instructions, and wherein the branch prediction circuitry is arranged to generate the prediction in further dependence on a mathematical distance metric of the hypervector from the stored at least one of the taken hypervector and the not-taken hypervector for each of the lengths of sequences of addresses of branch instructions.

Clause 9. The apparatus as claimed in clause 8, wherein the branch prediction circuitry is arranged to generate the prediction based on a longest sequence of addresses of branch instructions for which the mathematical distance metric of the hypervector from the stored at least one of the taken hypervector and the not-taken hypervector exceeds a threshold.

Clause 10. The apparatus as claimed in any preceding clause, wherein when adding the hypervector to the stored taken hypervector or the stored not-taken hypervector in dependence on the resolution of the branch, the branch prediction circuitry is arranged to apply a value limitation function to each hypervector element.

Clause 11. The apparatus as claimed in clause 10, wherein the hypervector generation circuitry is arranged to generate the hypervector comprising elements each representing a value of either +1 or −1, and wherein the value limitation function maps:
positive values to +1;
negative values to −1; and
a value of 0 to a random selection of either +1 or −1.

Clause 12. The apparatus as claimed in clause 10, wherein the hypervector generation circuitry is arranged to generate the hypervector comprising elements each representing a value of either 1 or 0, and wherein the value limitation function constrains:
addition of two elements representing 1 to generate 1;
addition of two elements representing 0 to generate 0; and
addition of an element representing 1 and an element representing 0 to generate a random selection of either 1 or 0.

Clause 13. The apparatus as claimed in any preceding clause, wherein the branch prediction circuitry is responsive to the resolution of the branch specified by the branch instruction, when the resolution indicates that the prediction generated by the branch prediction circuitry for the branch was a misprediction, to subtract the hypervector from either the stored taken hypervector or the stored not-taken hypervector in dependence on the resolution of the branch.

Clause 14. The apparatus as claimed in any preceding clause, wherein the branch prediction circuitry is responsive to the resolution of the branch specified by the branch instruction when the processing circuitry has executed the branch instruction to add a subset of elements of the hypervector to a subset of elements of either the stored taken hypervector or the stored not-taken hypervector in dependence on the resolution of the branch.

Clause 15. The apparatus as claimed in clause 14, wherein the branch prediction circuitry is arranged to add a further subset of elements of the hypervector comprising randomised values to a further subset of elements of either the stored taken hypervector or the stored not-taken hypervector in dependence on the resolution of the branch,
wherein the subset of elements and the further subset of elements are mutually exclusive.

Clause 16. The apparatus as claimed in any preceding clause, wherein the branch prediction circuitry comprises analogue mathematical distance metric determination circuitry comprising hypervector comparison couplings arranged selectively to apply a per-element charge to a charge accumulation line, wherein each hypervector comparison coupling is responsive to a respective element of the hypervector matching a respective element of the stored at least one of the taken hypervector and the not-taken hypervector to apply the per-element charge to the charge accumulation line, and an accumulated charge on the charge accumulation line above a threshold charge is interpreted as a hypervector match.

Clause 17. The apparatus as claimed in any preceding clause, wherein the branch prediction circuitry comprises branch history storage responsive to the branch instruction to store a branch history indication of whether the branch instruction has previously been taken or not-taken,
wherein the branch prediction circuitry is arranged to generate a combination of the branch history indication and an indication of the address of the branch instruction and to cause the hypervector generation circuitry to generate a further hypervector in deterministic dependence on the combination,
and wherein the branch prediction circuitry is arranged to generate a further prediction in dependence on a mathematical distance metric of the further hypervector from the stored at least one of the taken hypervector and the not-taken hypervector.

Clause 18. The apparatus as claimed in any preceding clause, wherein the mathematical distance metric uses a dot product between the hypervectors compared.

Clause 19. The apparatus as claimed in any preceding clause, wherein the mathematical distance metric is a Hamming distance.

Clause 20. A method of branch prediction comprising:
performing data processing operations in response instructions, wherein the instructions comprises branch instructions;
generating a prediction with respect to a branch instruction of whether a branch specified by the branch instruction will be taken or not-taken;
storing at least one of a taken hypervector and a not-taken hypervector;
performing speculative instruction execution based on the prediction generated;
assigning an arbitrary hypervector in deterministic dependence on an address of the branch instruction, wherein the hypervector comprises at least 500 bits;
adding the hypervector to the stored taken hypervector or the stored not-taken hypervector in dependence on a resolution of the branch when the branch instruction has been executed; and
generating the prediction in dependence on a mathematical distance metric of the hypervector from the stored at least one of the taken hypervector and the not-taken hypervector.

Clause 21. An apparatus comprising:
means for performing data processing operations in response instructions, wherein the instructions comprises branch instructions;
means for generating a prediction with respect to a branch instruction of whether a branch specified by the branch instruction will be taken or not-taken;
means for storing at least one of a taken hypervector and a not-taken hypervector;
means for performing speculative instruction execution based on the prediction generated;
means for assigning an arbitrary hypervector in deterministic dependence on an address of the branch instruction, wherein the hypervector comprises at least 500 bits;
means for adding the hypervector to the stored taken hypervector or the stored not-taken hypervector in dependence on a resolution of the branch when the branch instruction has been executed; and
means for generating the prediction in dependence on a mathematical distance metric of the hypervector from the stored at least one of the taken hypervector and the not-taken hypervector.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:
1. An apparatus comprising:
processing circuitry configured to perform data processing operations in response to instructions, wherein the instructions comprises branch instructions;
branch prediction circuitry configured to generate a prediction with respect to a branch instruction of whether a branch specified by the branch instruction will be taken or not-taken; and
hypervector storage configured to store at least one of a taken hypervector and a not-taken hypervector,
wherein the processing circuitry is configured to perform speculative instruction execution based on the prediction generated by the branch prediction circuitry,
and the branch prediction circuitry comprises hypervector generation circuitry configured to assign an arbitrary hypervector in deterministic dependence on an address of the branch instruction, wherein the hypervector comprises at least 500 bits,
wherein the branch prediction circuitry is responsive to a resolution of the branch specified by the branch instruction when the processing circuitry has executed the branch instruction to add the hypervector to the stored taken hypervector or the stored not-taken hypervector in dependence on the resolution of the branch,
wherein the branch prediction circuitry is configured to generate the prediction in dependence on a mathematical distance metric of the hypervector from the stored at least one of the taken hypervector and the not-taken hypervector, and
wherein when adding the hypervector to the stored taken hypervector or the stored not-taken hypervector in dependence on the resolution of the branch, the branch prediction circuitry is configured to apply a value limitation function to each hypervector element.

2. The apparatus as claimed in claim 1, wherein the hypervector storage is configured to store the taken hypervector and the not-taken hypervector,
wherein the branch prediction circuitry is responsive to a resolution of the branch specified by the branch instruction when the processing circuitry has executed the branch instruction to add the hypervector to either the stored taken hypervector or the stored not-taken hypervector in dependence on the resolution of the branch,
and wherein the branch prediction circuitry is configured to generate the prediction as taken when the mathematical distance metric of the hypervector from the stored taken hypervector is smaller than the mathematical distance metric of the hypervector from the stored not-taken hypervector and to generate the prediction as not-taken when the mathematical distance metric of the hypervector from the stored not-taken hypervector is smaller than the mathematical distance metric of the hypervector from the stored taken hypervector.

3. The apparatus as claimed in claim 1, wherein the hypervector generation circuitry is configured to generate the hypervector in deterministic dependence on a sequence of addresses of branch instructions.

4. The apparatus as claimed in claim 3, wherein the hypervector generation circuitry is configured to generate a respective hypervector for each address of the sequence of addresses of branch instructions and to combine the respective hypervectors to generate the hypervector.

5. The apparatus as claimed in claim 4, wherein the hypervector generation circuitry is configured to combine the respective hypervectors to generate the hypervector by applying an element translocation to each hypervector, wherein a number of element positions by which each hypervector is translocated is dependent on a number of branches by which each branch is separated from a current branch subject of the branch prediction.

6. The apparatus as claimed in claim 3, wherein the hypervector generation circuitry is configured to generate the respective hypervector for each address of the sequence of addresses of branch instructions in further dependence on a direction bit indicative of whether the branch of each branch instruction was taken or not-taken.

7. The apparatus as claimed in claim 3, wherein the hypervector generation circuitry is configured to generate the hypervector by removing an oldest hypervector contribution from an oldest branch instruction from a preceding sequence of addresses of branch instructions and adding a newest hypervector contribution from a youngest branch instruction of the sequence of addresses of branch instructions.

8. The apparatus as claimed in claim 3, wherein the hypervector storage is configured to store the at least one of a taken hypervector and a not-taken hypervector for each of a range of lengths of sequences of addresses of branch instructions,
and wherein the branch prediction circuitry is configured to generate the prediction in further dependence on a mathematical distance metric of the hypervector from the stored at least one of the taken hypervector and the not-taken hypervector for each of the lengths of sequences of addresses of branch instructions.

9. The apparatus as claimed in claim 8, wherein the branch prediction circuitry is configured to generate the prediction based on a longest sequence of addresses of branch instructions for which the mathematical distance metric of the hypervector from the stored at least one of the taken hypervector and the not-taken hypervector exceeds a threshold.

10. The apparatus as claimed in claim 1, wherein the hypervector generation circuitry is configured to generate the hypervector comprising elements each representing a value of either +1 or −1, and wherein the value limitation function maps:
positive values to +1;
negative values to −1; and
a value of 0 to a random selection of either +1 or −1.

11. The apparatus as claimed in claim 1, wherein the hypervector generation circuitry is configured to generate the hypervector comprising elements each representing a value of either 1 or 0, and wherein the value limitation function constrains:
addition of two elements representing 1 to generate 1;
addition of two elements representing 0 to generate 0; and
addition of an element representing 1 and an element representing 0 to generate a random selection of either 1 or 0.

12. The apparatus as claimed in claim 1, wherein the branch prediction circuitry is responsive to the resolution of the branch specified by the branch instruction, when the resolution indicates that the prediction generated by the branch prediction circuitry for the branch was a misprediction, to subtract the hypervector from either the stored taken hypervector or the stored not-taken hypervector in dependence on the resolution of the branch.

13. The apparatus as claimed in claim 1, wherein the branch prediction circuitry is responsive to the resolution of the branch specified by the branch instruction when the processing circuitry has executed the branch instruction to add a subset of elements of the hypervector to a subset of elements of either the stored taken hypervector or the stored not-taken hypervector in dependence on the resolution of the branch.

14. The apparatus as claimed in claim 13, wherein the branch prediction circuitry is configured to add a further subset of elements of the hypervector comprising randomised values to a further subset of elements of either the stored taken hypervector or the stored not-taken hypervector in dependence on the resolution of the branch,
wherein the subset of elements and the further subset of elements are mutually exclusive.

15. The apparatus as claimed in claim 1, wherein the branch prediction circuitry comprises analogue mathematical distance metric determination circuitry comprising hypervector comparison couplings configured selectively to apply a per-element charge to a charge accumulation line, wherein each hypervector comparison coupling is responsive to a respective element of the hypervector matching a respective element of the stored at least one of the taken hypervector and the not-taken hypervector to apply the per-element charge to the charge accumulation line, and an accumulated charge on the charge accumulation line above a threshold charge is interpreted as a hypervector match.

16. The apparatus as claimed in claim 1, wherein the branch prediction circuitry comprises branch history storage responsive to the branch instruction to store a branch history indication of whether the branch instruction has previously been taken or not-taken,
wherein the branch prediction circuitry is configured to generate a combination of the branch history indication and an indication of the address of the branch instruction and to cause the hypervector generation circuitry to generate a further hypervector in deterministic dependence on the combination, and wherein the branch prediction circuitry is configured to generate a further prediction in dependence on a mathematical distance metric of the further hypervector from the stored at least one of the taken hypervector and the not-taken hypervector.

17. The apparatus as claimed in claim 1, wherein the mathematical distance metric uses a dot product between the hypervectors compared.

18. The apparatus as claimed in claim 1, wherein the mathematical distance metric is a Hamming distance.

19. A method of branch prediction comprising:
performing data processing operations in response to instructions, wherein the instructions comprises branch instructions;
generating a prediction with respect to a branch instruction of whether a branch specified by the branch instruction will be taken or not-taken;
storing at least one of a taken hypervector and a not-taken hypervector;
performing speculative instruction execution based on the prediction generated;
assigning an arbitrary hypervector in deterministic dependence on an address of the branch instruction, wherein the hypervector comprises at least 500 bits;
adding the hypervector to the stored taken hypervector or the stored not-taken hypervector in dependence on a resolution of the branch when the branch instruction has been executed; and
generating the prediction in dependence on a mathematical distance metric of the hypervector from the stored at least one of the taken hypervector and the not-taken hypervector; and
when adding the hypervector to the stored taken hypervector or the stored not-taken hypervector in dependence on the resolution of the branch, applying a value limitation function to each hypervector element.

* * * * *